United States Patent [19]
Tagawa et al.

[11] Patent Number: 5,410,329
[45] Date of Patent: Apr. 25, 1995

[54] DISPLAY-INTEGRATED TYPE TABLET DEVICE

[75] Inventors: Takao Tagawa, Kashihara; Kengo Takahama, Nara; Kazunari Okamura, Tenri; Noritoshi Kako, Nara, all of Japan

[73] Assignee: Sharp Kabushiki Kaisha, Osaka, Japan

[21] Appl. No.: 65,610

[22] Filed: May 21, 1993

[30] Foreign Application Priority Data

May 22, 1992 [JP] Japan .................................. 4-130685
Oct. 20, 1992 [JP] Japan .................................. 4-281559

[51] Int. Cl.⁶ ...................................... G09G 3/36
[52] U.S. Cl. ...................................... 345/104; 345/174
[58] Field of Search ............... 345/178, 182, 104, 174; 178/18, 19; 307/351, 354, 358; 328/151, 162, 165

[56] References Cited

U.S. PATENT DOCUMENTS

| | | | |
|---|---|---|---|
| 4,709,209 | 11/1987 | Murakami et al. | 178/18 |
| 4,789,838 | 12/1988 | Cheng | 307/351 |
| 4,818,851 | 4/1989 | Kimura | 178/19 |
| 4,839,634 | 6/1989 | More et al. | 345/104 |
| 4,841,290 | 6/1989 | Nakano et al. | 345/182 |
| 5,119,404 | 6/1992 | Aihara | 307/354 |
| 5,214,319 | 5/1993 | Abdi | 307/354 |
| 5,227,732 | 7/1993 | Hong | 307/358 |

FOREIGN PATENT DOCUMENTS 0204184  12/1980  European Pat. Off. .
0375328  6/1990  European Pat. Off. .

Primary Examiner—Alvin E. Oberley
Assistant Examiner—Vivian Chang
Attorney, Agent, or Firm—David G. Conlin; Kevin J. Fournier

[57] ABSTRACT

A detection and hold circuit outputs a reference signal having a level proportional to an x-coordinate detection pulse input from an X-coordinate signal amplifier. A delay element delays the reference signal. An adder adds the x-coordinate detection pulse from the X-coordinate signal amplifier and a delayed signal from the delay element. Comparators obtain a coordinate detection pulse making a detection signal from another detection and hold circuit for an LCD voltage inversion pulse serve as a reference signal. Thus noise following the x-coordinate detection pulse is removed to generate a coordinate detection pulse with a reference value corresponding to the level of the LCD voltage inversion pulse to allow a stable coordinate detection to be achieved. A correction signal generation circuit reads out correction data stored in an internal memory and transmits the data as a correction signal to a correction voltage generation circuit in an x-coordinate detection period when the segment electrode placed in the lower position is scanned. The correction voltage generation circuit generates a correction voltage for canceling a voltage induced at the common electrode placed in the upper position based on the input correction signal and a bias power source input from a DC power supply circuit.

29 Claims, 26 Drawing Sheets

Operational amp

Fig. 6
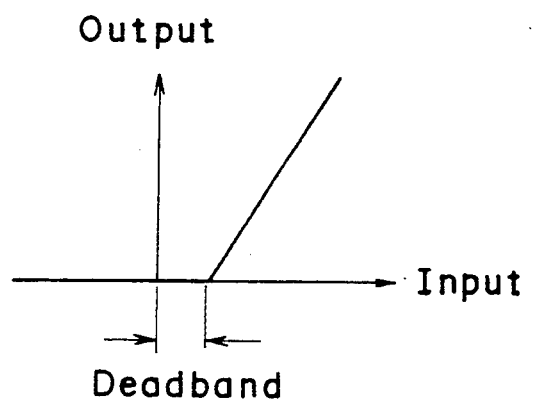
Fig. 7
Output signal from x-coordinate signal amp 23
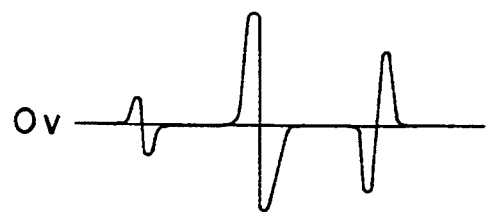
Output signal from detection and hold ckt 24
Output signal from delay element 25
Output signal from adder 26
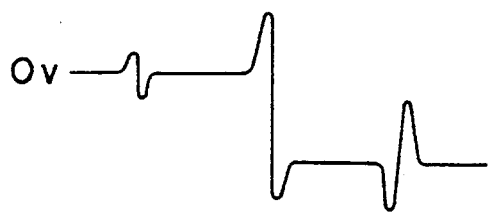

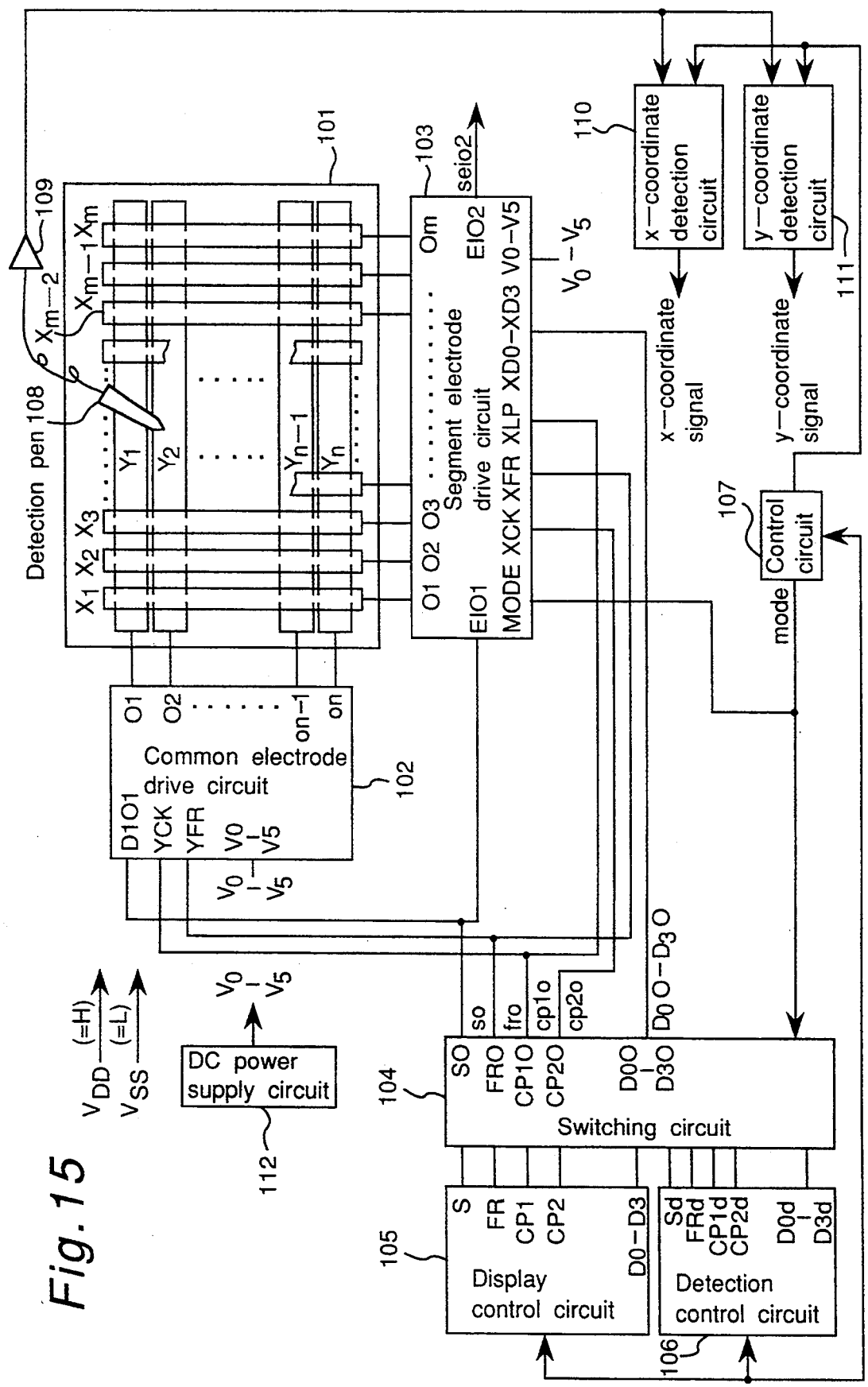

DISPLAY-INTEGRATED TYPE TABLET DEVICE

BACKGROUND OF THE INVENTION

The present invention relates to a display-integrated type tablet device for use in a personal computer, a word processor, or the like.

As a means for inputting a handwritten letter or a figure into a computer or a word processor, there has been put into practical use a display-integrated type tablet device which is formed by laminating an electrostatic induction type tablet on a liquid crystal display and is capable of receiving an input of a letter or a figure into its electrostatic induction type tablet as if the letter or figure were written on paper by writing implements. However, in such a display-integrated type tablet device, electrodes are viewed as a grating on the display screen due to a difference in reflectance or transmittance between a portion having an electrode and a portion having no electrode, which has been a cause of degrading the quality of an image displayed on the liquid crystal display screen.

As a tablet free of the above-mentioned drawback, lately a display-integrated type tablet device as shown in FIG. 15 is proposed by the applicant of the present invention (Japanese Patent Application No. 3-46751 and a co-pending U.S. patent application Ser. No. 07/849,733) though it is not yet well known. It should be noted that the above-mentioned device is not a prior art, and herein described for better understanding of the present invention.

In the above-mentioned display-integrated type tablet device, electrodes concurrently serve as image display electrodes of a liquid crystal display (LCD) and as coordinate detection electrodes of an electrostatic type tablet device. There are provided in one frame period a coordinate detection period when designated coordinates on the tablet are detected and an image display period when an image is displayed as shown in FIG. 16 to time-sharingly effect the coordinate detection and image display.

Referring to FIG. 15, an LCD panel 101 is constructed by interposing liquid crystals between common electrodes $Y_1$ through $Y_n$ (an arbitrary common electrode represented by Y hereinafter) and segment electrodes $X_1$ through $X_m$ (an arbitrary segment electrode represented by X hereinafter) which are arranged at right angles to each other, in which each portion where a common electrode Y and a segment electrode X cross each other constitutes each pixel. In other words, $n \times m$ dot pixels are arranged in matrix in the LCD panel 101.

The above-mentioned display-integrated type tablet device has an advantage of permitting cost reduction as well as compact and light weight design by virtue of the concurrent use of the electrodes and drive circuits as those of the liquid crystal display and those of the electrostatic induction type tablet in addition to an advantage of making the grating-shaped electrodes invisible for a better image presentation in contrast to the conventional type formed by laminating the electrostatic induction type tablet on the liquid crystal display.

The above-mentioned display-integrated type tablet device operates as follows. A common electrode drive circuit 102 for driving the common electrode Y and a segment electrode drive circuit 103 for driving the segment electrode X are connected to a display control circuit 105 and a detection control circuit 106 via a switching circuit 104. The switching circuit 104 is controlled by a control circuit 107 so that it outputs an output signal from the display control circuit 105 to the common electrode drive circuit 102 and the segment electrode drive circuit 103 in an image display period or outputs an output from the detection control circuit 106 to the common electrode drive circuit 102 and the segment electrode drive circuit 103 in a coordinate detection period.

Although the switching circuit 104, the display control circuit 105, the detection control circuit 106, and the control circuit 107 are expressed dividedly in blocks in FIG. 15, the circuits are integrated in an LSI (Large Scale Integrated) circuit in practice. Therefore, the LSI cannot be strictly sectioned into such blocks in a practical circuit arrangement.

In the aforementioned image display period, a mode signal (mode) output from the control circuit 107 to the segment electrode drive circuit 103 and to the switching circuit 104 is switched to an image display mode. Consequently, the segment electrode drive circuit 103 selects the image display mode, while the switching circuit 104 switches so as to select and output an output signal from the display control circuit 105.

Then there are output, from the display control circuit 105, shift data s from a shift data output terminal S, an inversion signal fr from an inversion signal output terminal FR, a clock signal cp1 from a clock output terminal CP1, a clock signal cp2 from a clock output terminal CP2, and display data $D_0$ through $D_3$ from data output terminals D0 through D3.

The above-mentioned clock signal cp1 is a clock signal which has a period when pixels in one line display an image, and the signal is input as a clock signal cp1o to a clock input terminal YCK of the common electrode drive circuit 102 and a latch pulse input terminal XLP of the segment electrode drive circuit 103 via an output terminal CP1O of the switching circuit 104. The shift data s which is a pulse signal for selecting a specified common electrode Y is input as shift data (so) to a shift data input terminal DIO1 of the common electrode drive circuit 102 in synchronization with the clock signal cp1o via an output terminal SO of the switching circuit 104.

When the shift data so is input to the common electrode drive circuit 102, the pulse position of the shift data so is shifted in a shift register in synchronization with the clock signal cp1o, and drive pulses of a common electrode drive signal are applied to the common electrodes $Y_1$ through $Y_n$ from output terminals O1 through On of the common electrode drive circuit 102 in correspondence with the shift position. The common electrode drive signal is generated based on bias power sources $V_0$ through $V_5$ supplied from a DC power supply circuit 112.

The above-mentioned clock signal cp2 is a clock signal which has a period being a division of a period when pixels in one line displays an image, and the signal is input as a clock signal cp2o to a clock input terminal XCK of the segment electrode drive circuit 103 via an output terminal CP2O of the switching circuit 104.

The image display data $D_0$ through $D_3$ are input as display data $D_{00}$ through $D_{30}$ to input terminals XD0 through XD3 of the segment electrode drive circuit 103 via output terminals D0O through D3O of the switching circuit 104, and then successively taken into a register in the segment electrode drive circuit 103 in synchronization with the clock signal cp2o. When all the image display data corresponding to the pixels in one line are taken in, the display data taken in are latched at a timing of the clock signal cp1o input to the latch pulse input terminal XLP. Then drive pulses of the segment electrode drive signal corresponding to the display data are applied from output terminals O1 through Om of the segment electrode drive circuit 103 to the segment electrodes $X_1$ through $X_m$. The segment drive signal is also generated based on the bias power sources $V_0$ through $V_5$ supplied from the DC power supply circuit 112.

It is noted that the inversion signal fr is a signal for preventing the possible deterioration of the liquid crystals due to electrolysis by periodically inverting the direction of voltage application to the liquid crystals in the image display period. The inversion signal fr is input as an inversion signal fro to an inversion signal input terminal YFR of the common electrode drive circuit 102 and an inversion signal input terminal XFR of the segment electrode drive circuit 103 via an inversion signal output terminal FRO of the switching circuit 104.

Thus the pixel matrix of the LCD panel 101 is line-sequentially driven by the operations of the above-mentioned common electrode drive circuit 102 and the segment electrode drive circuit 103 to display an image corresponding to the display data $D_0$ through $D_3$ on the LCD panel 101.

In the aforementioned coordinate detection period, the mode signal (mode) output from a control circuit 107 to the segment electrode drive circuit 103 and to the switching circuit 104 is switched to a coordinate detection mode. Consequently, the segment electrode drive circuit 103 selects the coordinate detection mode, while the switching circuit 104 switches so as to select and output an output signal from the detection control circuit 106.

Then there are output, from the detection control circuit 106, shift data sd from a shift data output terminal Sd, an inversion signal frd from an inversion signal output terminal FRd, a clock signal cp1d from a clock output terminal CP1d, a clock signal cp2d from a clock output terminal CP2d, and drive data $D_0d$ through $D_3d$ from data output terminals D0d through D3d.

The clock signal cp1d is a clock signal which has a period when one common electrode Y or one segment electrode X is scanned, and the signal is input as the clock signal cp1o to the clock input terminal YCK of the common electrode drive circuit 102 and the latch pulse input terminal XLP of the segment electrode drive circuit 103 via the output terminal CP1O of the switching circuit 104. Meanwhile, the shift data sd which is a pulse signal for selecting a specified common electrode Y or segment electrode X is input as the shift data (so) to the shift data input terminal DIO1 of the common electrode drive circuit 102 or to a data input terminal EIO1 of the segment electrode drive circuit 103 via the output terminal SO of the switching circuit 104 in synchronization with the aforementioned clock signal cp1d.

Then, in the same manner as described above, the pulse position of the shift data so input to the common electrode drive circuit 102 is shifted in a shift register in synchronization with the clock signal cp1o, and scanning pulses of common electrode drive signals $y_1$ through $Y_n$ (arbitrary common electrode scanning signal represented by y hereinafter) are successively applied from the output terminals O1 through On corresponding to the shift position to the common electrodes $Y_1$ through $Y_n$. The common electrode scanning signal y is generated based on the bias power sources $V_0$ through $V_5$ supplied from the DC power supply circuit 112.

Meanwhile, the pulse position of the shift data so input to the segment electrode drive circuit 103 which has been selected to be in the coordinate detection mode is shifted in a shift register in synchronization with the clock signal cp1o, and scanning pulses of segment electrode drive signals $x_1$ through $x_n$ (arbitrary segment electrode scanning signal represented by x hereinafter) are successively applied from the output terminals O1 through Om corresponding to the shift position to the segment electrodes $X_1$ through $X_m$.

Although the above described the case where the segment electrode X is scanned based on the shift data so and the clock signal cp1o, the segment electrode X may be scanned in the following manner. That is, the segment electrode scanning signal x is output to the segment electrodes $X_1$ through $X_m$ from the output terminals O1 through Om of the segment electrode drive circuit 103 while making any bit of the drive data $D_0d$ through $D_3d$ output from the detection control circuit 106 serve as the shift data sd and making the clock signal cp2d serve as a sync signal.

In the above case, the clock signal cp2d is a clock signal which has a period when the segment electrode X is scanned, and the signal is input as the clock signal cp2o to the clock input terminal XCK of the segment electrode drive circuit 103 via the output terminal CP2O of the switching circuit 104.

The drive data $D_0d$ through $D_3d$ are input as drive data $D_00$ through $D_30$ to the input terminals XD0 through XD3 of the segment electrode drive circuit 103 via the output terminals D0O through D3O of the switching circuit 104, and then successively taken into the register of the segment electrode drive circuit 103 in synchronization with the clock signal cp2o. Then scanning pulses of the segment electrode scanning signals $x_1$ through $x_m$ corresponding to the above-mentioned drive data are output from the output terminals O1 through $O_m$ of the segment electrode drive circuit 103 to segment electrodes $X_1$ through Xm. The segment electrode scanning signal x is also generated based on the bias power sources $V_0$ through $V_5$ supplied from the DC power supply circuit 112.

It is noted that the output terminal EIO2 of the segment electrode drive circuit 103 is the output terminal of the final stage of the shift register, and the output terminal EIO2 outputs a pulse signal seio2 having the same pulse width as that of the shift data sd as shown in FIG. 18.

The segment electrode scanning signal x is also generated based on the bias power sources $V_0$ through $V_5$ supplied from the DC power supply circuit 112.

FIG. 20 is a timing chart of the scanning signals in the coordinate detection period of the above-mentioned display-integrated type tablet device. The coordinate detection period is separated into an x-coordinate detection period and a subsequent y-coordinate detection period. In the x-coordinate detection period, scanning pulses of the segment electrode scanning signal x are successively applied to the segment electrode X. In the y-coordinate detection period, scanning pulses of the common electrode scanning signal y are successively applied to the common electrode Y.

In the above case, the scanning pulse voltage of the segment electrode scanning signal x or the common electrode scanning signal y for one of the segment electrode X or the common electrode Y to be scanned (the voltage referred to as the "scanning voltage" hereinafter) is set at the bias power source $V_5$ supplied from the DC power supply circuit 112. On the other hand, the scanning pulse voltage of the segment electrode scanning signal x or the common electrode scanning signal y for the other of the segment electrode X or the common electrode Y to be not scanned (the voltage referred to as the "non-scanning voltage" hereinafter) is set at the bias power source $V_1$ supplied from the DC power supply circuit 112.

With application of the above-mentioned scanning signal $V_5$, a voltage is induced at a designation coordinate detection pen (referred to merely as the "detection pen" hereinafter) 108 as shown in FIG. 17(b) due to a floating capacitance between the segment electrode X or the common electrode Y and a tip electrode of the detection pen 108 as shown in FIG. 17(a). The voltage induced at the detection pen 108 is amplified in an amplifier 109 and then converted into a binary signal as shown in FIG. 17(c) to be input to an x-coordinate detection circuit 110 and a y-coordinate detection circuit 111.

The x-coordinate detection circuit 110 and the y-coordinate detection circuit 111 detect the x-coordinate value or the y-coordinate value of a position designated by the detection pen 108 by detecting a period "T" from the time when the scanning voltage signal $V_5$ is applied to the time when an induction voltage takes its maximum value based on an output from the amplifier 109 and a timing signal from the control circuit 107.

FIG. 21 shows a relation in position between the LCD panel 101 and the detection pen 108. When directly touching the LCD panel 101 with the detection pen 108, a stress is applied to a polarizer 114 and an LCD enclosure glass plate 115 to modulate the transmittance of the LCD panel 101, and consequently so-called a Newton-ring-shaped pattern appears. Therefore, a transparent protection plate 116 such as glass or acrylic resin is interposed between the LCD panel 101 and the detection pen 108 to provide an air gap 117 so as not to apply any stress onto the LCD panel 101.

However, in the display-integrated tablet construction as shown in FIG. 21, the stress onto the LCD panel 101 can be avoided but the transparent protection plate 116 is significantly deformed by the stress, which results in greatly varying the distance between the segment electrode X as well as the common electrode Y (referred to merely as the "scanning electrode" hereinafter) and a detection electrode 113 of the detection pen 108. In such a display-integrated type tablet device, coordinate detection is effected taking advantage of an electrostatic induction phenomenon. Therefore, the output of the detection pen 108 varies in reverse proportion to the distance between the scanning electrodes X and Y and the detection electrode 113.

Therefore, in a normal system where the analog output of the detection pen 108 is converted into a binary signal with a fixed threshold to obtain a detection pulse, there is a problem that a secured detection pulse cannot be obtained for a detection signal having a low signal-to-noise ratio.

In the above case, there can be presented an electrical equivalent circuit of the LCD panel 101 in the x-coordinate detection period when the common electrodes is fixed at the voltage $V_0$ and the segment electrodes receive a voltage which changes from the voltage $V_0$ to the voltage $V_5$ and again to the voltage $V_0$ as shown in FIG. 22. It is noted that $rcd_1$ through $rcd_n$ are internal resistance values of the common electrode drive circuit 102, $rsd_1$ through $rsd_m$ are internal resistance values of the segment electrode drive circuit 103, $rc_{1'1}$ through $rc_{n'm}$ are resistance values of the common electrodes, $rs_{1'1}$ through $rs_{n'm}$ are resistance values of the segment electrodes, and each of $C_{1'1}$ through $C_{n'm}$ is a capacitance of one pixel of the LCD.

In the above case, by ignoring the resistance values $rs_{1'1}$ through $rs_{n'm}$ and assuming $rc_{1'1}=rc_{1'2}= \ldots =rc_{n'm}=rc$, $rcd_1=rcd_2= \ldots =rcd_n=rcd$, $C_{1'1}=C_{1'2}= \ldots =C_{n'm}=C$, and $rsd_1=rsd_2= \ldots =rsd_m=rsd$, the equivalent circuit as shown in FIG. 22 can be further simplified as shown in FIG. 23.

Referring to FIG. 23, each of the capacitors of segment electrodes to which is applied the voltage $V_0$ has no electric charge, while each of the capacitors of the segment electrodes to which is applied the voltage $V_5$ has an electric charge of $(V_5-V_0)/n/C$. It is noted that the voltage $V_5$ is simultaneously applied to four segment electrodes in FIG. 23.

When the scanning of the segment electrodes progresses by one clock pulse in the condition as shown in FIG. 23, a condition as shown in FIG. 24 is achieved. Consequently, there is formed a discharge current through the capacitor of the segment electrode X at which the electric potential has changed from the voltage $V_5$ to the voltage $V_0$. Meanwhile, there is formed a charge current through the capacitor of the segment electrode X at which the electric potential has changed from the voltage $V_0$ to the voltage $V_5$. Since rc/n can be ignored in comparison to rsd, the above-mentioned charge and discharge currents do not flow into the common driver.

However, as shown in FIG. 25, the charge and discharge currents of the capacitors flow into the common electrode drive circuit 102 at the time of starting the scanning of the segment electrode X (the voltage $V_5$ is applied only to the segment electrode $X_1$ closest to the common electrode drive circuit 102), and therefore a voltage drop takes place because of the output impedance of the common electrode drive circuit 102. Such a voltage drop is superimposed on the entire common electrodes.

A voltage drop due to the resistance of the common electrodes is additionally superimposed at the time of ending the scanning of the segment electrode X (the voltage $V_5$ is applied only to the segment electrode $X_m$ farthest from the common electrode drive circuit 102) as shown in FIG. 26, and therefore an increased amount of noise takes place at the scanning end time as compared with the scanning start time.

In an arrangement of the LCD panel 101, the transparent protection plate 116, and the detection pen 108 as shown in FIG. 21, the electrostatic coupling between the detection electrode 113 of the detection pen 108 and the common electrodes is strong, and the electrostatic coupling between the detection electrode 113 and the segment electrodes is very weak. Therefore, the noise superimposed on the common electrodes exerts great influence. In the normal system where the analog output of the detection pen 108 is converted into a binary signal with a fixed threshold to obtain a coordinate pulse, the detection signal induced at the detection pen 108 in scanning the segment electrodes has a degraded signal-to-noise ratio as shown in FIG. 27.

The above fact also results in a problem that no secured coordinate pulse for detecting the x-coordinate value can be obtained.

In the above-mentioned electrostatic induction type tablet, the detection signal of the detection pen 108 is obtained as a signal of which DC component is lost. In the output of the detection pen in the display-integrated type tablet device employing an electrostatic induction type tablet, an LCD image display polarity inversion pulse, a y-coordinate detection pulse, and an x-coordinate detection pulse can be obtained as analog signals respectively in the image display period, the y-coordinate detection period, and the x-coordinate detection period. Therefore, a delay of a low-frequency component takes place due to a capacitive coupling in the x-coordinate detection circuit 110 and the y-coordinate detection circuit 111, and each of the pulses exerts a low-frequency interference with the other pulses, which results in the appearance of an error in coordinate detection.

FIG. 18 shows a timing chart of a segment electrode scanning signal x applied to the segment electrode X of the LCD panel 101 and waveforms of the output signal from the detection pen 108 or the amplifier 109 in the x-coordinate detection period. FIG. 19 shows an equivalent circuit of the common electrode drive circuit 102 and the segment electrode drive circuit 103 in the x-coordinate detection period.

Referring to FIG. 19, switch units $S_1, S_2, \ldots S_m$ in the segment electrode drive circuit 103 successively apply the scanning voltage $V_5$ to each segment electrode X, while switch units $S_{1'}, S_{2'}, \ldots S_{m'}$ in the common electrode drive circuit 102 successively apply the scanning voltage $V_5$ to each common electrode Y. The switch units are each composed of a CMOS (Complementary Metal Oxide Semiconductor) silicon gate circuit.

It is noted that resistors $r_{c1}, r_{c5}, r_{s1}$, and $r_{s5}$ are on-resistors.

The above-mentioned switch units $S_1, S_2, \ldots, S_{m-1}, S_m$ in the segment electrode drive circuit 103 are switched to the voltage $V_5$ sequentially from $S_1$ to $S_m$. Thus the scanning voltage $V_5$ of the segment electrode scanning signal x is applied to the segment electrode X sequentially from a segment electrode $X_1$ located at an end of the LCD panel 101 to a segment electrode $X_m$ located at the other end as shown in FIG. 18. Referring to FIG. 19, the switch units $S_2$, $S_3$, and $S_4$ are switched to the voltage $V_5$ to apply the scanning voltage to the segment electrodes $X_2$, $X_3$, and $X_4$, while the other switch units $S_1, S_5, \ldots S_m$ are switched to the voltage $V_1$ to apply the non-scanning voltage to the segment electrodes $X_1, X_5, \ldots X_m$.

When the segment electrode X is scanned in the above-mentioned manner, a voltage as shown by a waveform in FIG. 17(b) is induced at the detection electrode of the detection pen 108. The induction voltage is amplified in the amplifier 109 and then converted into a binary signal as shown by a waveform in FIG. 17(c). Then a peak time "T" of the induction voltage is obtained from the rise-time "$T_1$" and the fall-time "$T_2$" of the obtained binary signal to calculate the x-coordinate value designated by the tip end of the detection pen 108.

The induction voltage actually obtained through the segment electrode scanning has a waveform as shown by a waveform (d) in FIG. 18, where noise components F and R are detected at the scanning start time and at the scanning end time.

FIG. 18 shows a waveform (e) obtained by differentiating twice the induction voltage signal (referred to as the "detection signal" hereinafter) as shown by a waveform (d) in FIG. 18 in the amplification stage of the amplifier 109 to obtain a binary pulse as narrow as possible.

The voltage induced at the detection pen 108 when the detection pen 108 is placed on the LCD panel 101 ideally has a waveform as shown by a waveform (c) in FIG. 18. A detection signal having such an ideal waveform can be obtained when scanning the electrodes placed in the upper position closer to the detection pen 108 as in the case of the common electrode Y as shown in FIGS. 15, 17(a), and 19.

However, when scanning the electrodes placed in the lower position farther from the detection pen 108 as in the case of the segment electrode X, there is obtained a detection signal having the undesirable induction noise peaks (referred to as the "induction noise peak" hereinafter) F and R induced due to a voltage induced at the electrode (common electrode Y) placed closer to the detection pen 108 in addition to the peak S (referred to as the "detection peak" hereinafter) formed based on the electrode scanning signal as shown by a waveform (d) in FIG. 18.

Therefore, when scanning a portion near the segment electrode $X_1$ or a portion near the segment electrode $X_m$ located at end portions of the LCD panel 101, the detection signal peak S appears at the time of starting or ending the scanning in the x-coordinate detection period. Therefore, the induction noise peak F or the induction noise peak R is superimposed on the detection signal peak S to result in a problem that the accuracy in detecting the x-coordinate by means of the tip end of the detection pen is degraded.

The induction noise peaks F and R as described above appear as follows.

Since the resistance of the on-resistors $r_{c1}$ and $r_{c5}$ (=about 1 kΩ) and the electrode resistance r of the common electrode Y as shown in FIG. 19 are great, when the segment electrode X in the lower position is scanned while switching the switch units $S_1, S_2, \ldots S_m$ of the segment electrode drive circuit 103 successively to the voltage $V_5$, e.g., when the segment electrodes $X_2$, $X_3$, and $X_4$ are scanned, a current i caused by the scanning voltage applied to the segment electrodes $X_2$, $X_3$, and $X_4$ flows through the segment electrodes $X_2$, $X_3$, and $X_4$ by way of a floating capacitance C (about 10 pF/mm²) between the segment electrode X and the common electrode Y as shown by the arrow in FIG. 19 and then to the DC power supply circuit 112 by way of the on-resistor $r_{s5}$ inside the segment electrode drive circuit 103.

Therefore, the voltage at the common electrode Y which should be the non-scanning voltage $V_1$ shifts slightly to the scanning voltage $V_5$ (to the lower voltage side) of the segment electrode X as shown by a waveform (a) in FIG. 18.

Therefore, when the detection pen 108 is put close to the LCD panel 101 in the condition as shown in FIG. 19, there is induced a voltage as shown by the waveform (d) in FIG. 18 containing the wavy induction noise peaks F and R as shown by the waveform (b) in FIG. 18 attributed to the voltage induced at the common electrode Y as shown by the waveform (a) in FIG. 18 in addition to the detection signal peak S at the detection electrode of the detection pen 108. As a result, the output signal from the amplifier 109 is to have a waveform (e) as shown in FIG. 18.

In contrast to the fact that the common electrode Y placed in the upper position directly faces the detection electrode of the detection pen 108, the segment electrode X placed in the lower position faces the detection electrode of the detection pen 108 by way of a gap attributed to the common electrodes Y. Therefore, the electrostatic coupling force between the common electrode Y and the detection electrode of the detection pen 108 is much greater than the electrostatic coupling force between the segment electrode X and the detection electrode. Therefore, despite that the voltage at the common electrode Y shifted toward the side of the lower voltage is extremely low as shown by the waveform (a) in FIG. 18, the voltage induced at the detection electrode based on the slight voltage variance has the same level as that of the detection signal peak S.

When the detection pen 108 is located in the center position of the LCD panel 101, the induction noise peaks F and R can be separable from the detection signal peak S as shown by the waveform (d) in FIG. 18, and therefore the induction noise peaks F and R exert less influence.

However, when the detection pen 108 is located near the segment electrode $X_1$ or the segment electrode $X_m$, the detection signal peak S and the induction noise peaks F and R are superimposed on each other, the detection signal peak S is to have a complicatedly distorted waveform. Therefore, even when the detection signal is converted into a binary signal, the correct x-coordinate of the tip of the detection pen 108 cannot be detected.

Particularly, the induction noise peak R has a polarity reverse to that of the detection signal peak S. Therefore, when the detection pen 108 is located near the segment electrode $X_m$, the detection signal peak S and the induction noise peak R having opposite polarities are superimposed on each other to lower the level of the detection signal peak S to significantly reduce the coordinate detection accuracy. In an extreme case, the x-coordinate value cannot be detected.

SUMMARY OF THE INVENTION

The present invention has been developed with a view to substantially solving the above described disadvantages. Accordingly, a first object of the present invention is to provide an improved display-integrated type tablet device having a high coordinate detection accuracy, the tablet being capable of performing a stable coordinate detection even when distances between a detection electrode of a detection pen and a segment electrode and a common electrode vary, eliminating noise components generated in an output signal from the detection pen taking place at the time of ending the scanning, and preventing the possible interference of other pulses with a coordinate detection pulse of the above-mentioned output signal.

In order to achieve the aforementioned first object, there is provided a display-integrated type tablet device including a display panel which has a display material interposed between segment electrodes and common electrodes crossing each other at right angles and is driven by a duty ratio control type drive method, a detection pen having at a tip of the detection pen an electrode electrostatically coupled with the segment electrodes and the common electrodes of the display panel, a segment electrode drive circuit for driving the segment electrodes, a common electrode drive circuit for driving the common electrodes, a display control circuit for displaying an image on the display panel by controlling the segment electrode drive circuit and the common electrode drive circuit in a period of displaying the image, a detection control circuit for controlling the segment electrode drive circuit to sequentially scan the segment electrodes of the display panel by applying a scanning voltage successively to the segment electrodes and controlling the common electrode drive circuit to sequentially scan the common electrodes by applying a scanning voltage successively to the common electrodes in a coordinate detection period composed of a first scanning period and a second scanning period, an x-coordinate detection circuit for detecting an x-coordinate value designated on the display panel by the tip of the detection pen according to an output signal generating timing of the detection pen and a scanning timing of the segment electrodes, and a y-coordinate detection circuit for detecting a y-coordinate value designated on the display panel by the tip of the detection pen according to an output signal generating timing of the detection pen and a scanning timing of the common electrodes, wherein the detection control circuit being capable of controlling the segment electrode drive circuit and the common electrode drive circuit so that one which is positioned closer to the detection pen out of the segment electrodes and the common electrodes is scanned in the first scanning period and the other electrodes are scanned in the second scanning period subsequent to the first scanning period, the display-integrated type tablet device comprising a detection circuit which receives an output signal from the detection pen to detect and hold a voltage variation quantity of one of the segment electrodes and the common electrodes and outputs a reference signal corresponding to the voltage variation quantity of the one of the segment electrodes and the common electrodes in the first scanning period, and the coordinate detection circuit which is relevant to the other of the segment electrodes and the common electrodes, out of the x-coordinate detection circuit and the y-coordinate detection circuit, operating to detect a coordinate detection pulse in the output signal from the detection pen based on the reference signal from the detection circuit.

Also there is provided a display-integrated type tablet device including a display panel which has a display material interposed between segment electrodes and common electrodes crossing each other at right angles and is driven by a duty ratio control type drive method, a detection pen having at a tip of the detection pen an electrode electrostatically coupled with the segment electrodes and the common electrodes of the display panel, a segment electrode drive circuit for driving the segment electrodes, a common electrode drive circuit for driving the common electrodes, a display control circuit for displaying an image on the display panel by controlling the segment electrode drive circuit and the common electrode drive circuit in a period of displaying the image, a detection control circuit for controlling the segment electrode drive circuit to sequentially scan the segment electrodes of the display panel by applying a scanning voltage successively to the segment electrodes and controlling the common electrode drive circuit to sequentially scan the common electrodes by applying a scanning voltage successively to the common electrodes in a coordinate detection period, an x-coordinate detection circuit for detecting an x-coordinate value designated on the display panel by the tip of the detection pen according to an output signal generating timing of the detection pen and a scanning timing of the segment electrodes, and a y-coordinate detection circuit for detecting a y-coordinate value designated on the display panel by the tip of the detection pen according to an output signal generating timing of the detection pen and a scanning timing of the common electrodes, the display-integrated type tablet device comprising a detection circuit for receiving an output signal from the detection pen to detect and hold a voltage variation quantity of the segment electrodes and the common electrodes and outputting a reference signal corresponding to the voltage variations of the segment electrodes and the common electrodes in the image display period, and the x-coordinate detection circuit and the y-coordinate detection circuit operating to detect a coordinate detection pulse in the output signal from the detection pen based on the reference signal from the detection circuit.

It is preferable that the x-coordinate detection circuit or the y-coordinate detection circuit includes a detection circuit for detecting and holding a coordinate detection pulse in the output signal from the detection pen and outputting a detection signal, a delay circuit for delaying the detection signal from the detection circuit for a specified period of time, and a synthesis circuit for synthesizing the detection signal from the delay circuit and the output signal from the detection pen thereby suppressing noise following a peak of the coordinate detection pulse in the detection signal.

Further it is preferable that each of the x-coordinate detection circuit and the y-coordinate detection circuit includes three clamp circuits which respectively operate in synchronization with the image display period, a segment electrode scanning period, or a common electrode scanning period to take in either one of different signals of: the output signal from the detection pen in the image display period; the output signal from the detection pen in the segment electrode scanning period; or the output signal from the detection pen in the common electrode scanning period, thereby preventing mutual interference, which possibly occurs in the x-coordinate detection circuit or the y-coordinate detection circuit, between a display voltage inversion pulse, an x-coordinate detection pulse, and a y-coordinate detection pulse, which are forming a time series as included in the output signal from the detection pen.

According to the above-mentioned arrangement, the electrodes positioned on the side of the detection pen out of the segment electrodes or the common electrodes are scanned under the control of the detection control circuit in a first scanning period of the coordinate detection period. Then in the above time the output signal from the detection pen is input to the detection circuit to detect and hold the voltage variation quantity of one electrode group and output a reference signal according to the voltage variation quantity of the one electrode group. Then the coordinate detection pulse in the output signal from the detection pen is detected based on the reference signal from the detection circuit by means of a coordinate detection circuit relevant to the other electrode group out of the x-coordinate detection circuit and the y-coordinate detection circuit.

In the above-mentioned manner, based on the reference signal according to the voltage variation quantity of one electrode group at the time of scanning the one electrode group, the coordinate detection pulse contained in the output signal from the detection pen is detected by the coordinate detection circuit relevant to the other electrode group.

Therefore, the variation in level of the output signal from the detection pen due to the change of distance between the detection pen and the segment electrode or the common electrode can be corrected by the aforementioned reference signal.

Furthermore, according to the above-mentioned arrangement, the output signal from the detection pen in the image display period is input to the detection circuit to output a reference signal according to the voltage variation quantities of the segment electrode and the common electrode. Then based on the reference signal according to the voltage variation quantities of the segment electrode and the common electrode, the coordinate detection pulse contained in the output signal from the detection pen in the coordinate detection period is detected by the x-coordinate detection circuit and the y-coordinate detection circuit.

Furthermore, according to the above-mentioned arrangement, by means of the detection circuit of the x-coordinate detection circuit or the y-coordinate detection circuit, the coordinate detection pulse contained in the output signal from the detection pen is detected and held. Then the detection signal from the detection circuit is delayed for a specified period of time by the delay circuit. Thereafter, the detection signal from the delay circuit and the output signal from the detection pen are synthesized by the synthesis circuit.

Thus the noise following the peak of the coordinate detection pulse contained in the above-mentioned detection signal is suppressed.

Furthermore, according to the above-mentioned arrangement, the output signal from the detection pen in the image display period is taken in by the clamp circuit which operates in synchronization with the image display period. Further the output signal from the detection pen in the segment electrode scanning period is taken in by the clamp circuit which operates in synchronization with the segment electrode scanning period. Meanwhile, the output signal from the detection pen in the common electrode scanning period is taken in by the clamp circuit which operates in synchronization with the common electrode scanning period.

Thus the image display voltage inversion pulse, x-coordinate detection pulse, and the y-coordinate detection pulse contained in a time series form in the output signal from the detection pen can be prevented from interfering with each other in the x-coordinate detection circuit and the y-coordinate detection circuit.

It is a second object of the present invention to provide a display-integrated type tablet device capable of increasing coordinate detection accuracy by preventing detection of induction noise with the detection electrode of the detection pen.

In order to achieve the above-mentioned second object, there is provided a display-integrated type tablet device including a display panel which has a display material interposed between segment electrodes and common electrodes crossing each other at right angles and is driven by a duty ratio control type drive method, a detection pen having at a tip of the detection pen an electrode electrostatically coupled with the segment electrodes and the common electrodes of the display panel, a segment electrode drive circuit for driving the segment electrodes, a common electrode drive circuit for driving the common electrodes, a display control circuit for displaying an image on the display panel by controlling the segment electrode drive circuit and the common electrode drive circuit in a period of displaying the image, a detection control circuit for controlling the segment electrode drive circuit to sequentially scan the segment electrodes of the display panel by applying a scanning voltage successively to the segment electrodes and controlling the common electrode drive circuit to sequentially scan the common electrodes by applying a scanning voltage successively to the common electrodes in a coordinate detection period, an x-coordinate detection circuit for detecting an x-coordinate value designated on the display panel by the tip of the detection pen according to an output signal generating timing of the detection pen and a scanning timing of the segment electrodes, and a y-coordinate detection circuit for detecting a y-coordinate value designated on the display panel by the tip of the detection pen according to an output signal generating timing of the detection pen and a scanning timing of the common electrodes, the display-integrated type tablet device comprising a correction voltage generation means for generating a correction voltage for canceling a voltage induced at an electrode closer to the detection pen and placed in an upper position attributed to a scanning voltage applied to an electrode farther to the detection pen and placed in a lower position, the electrodes being one and the other of the segment electrode and the common electrode, thereby canceling the voltage induced at the electrode placed in the upper position by applying the correction voltage generated by the correction voltage generation means to the electrode placed in the upper position at least in a period when the electrode placed in the lower position is scanned.

It is preferable that the correction voltage generation means comprises: a correction signal generation circuit which stores, in an internal memory, digital correction data representing an inverted waveform of a waveform of the signal induced at the upper electrode attributed to the scanning voltage applied to the lower electrode, and reads the correction data to output the correction data as a correction signal; and a correction voltage generation circuit which receives the correction signal from the correction signal generation circuit and generates the correction voltage in an analog form based on the correction signal.

Further, it is preferable that each of the segment electrode drive circuit and the common electrode drive circuit comprises a shift register, and the correction voltage generation means comprises: a correction signal generation circuit which takes in a shift data signal for starting scanning when it is input to an input terminal of a first stage of the shift register of either one of the segment electrode drive circuit and the common electrode drive circuit for scanning the lower electrodes and takes in a pulse signal output from an output terminal of a final stage of the shift register at the time of ending the scanning to generate a binary correction signal having a pulse width substantially equal to the scanning period of the lower electrodes based on the shift data signal and the pulse signal; and a correction voltage generation circuit which receives the correction signal from the correction signal generation circuit to generate the correction voltage in an analog form based on the correction signal.

Furthermore, it is preferable that the display-integrated type tablet device comprises an auxiliary electrode facing the lower electrodes, wherein the correction voltage generation means comprises: a correction signal generation circuit which detects a voltage induced at the auxiliary electrode attributed the scanning voltage applied to the lower electrode and outputs the voltage as a correction signal; and a correction voltage generation circuit which receives the correction signal from the correction signal generation circuit to generate the correction voltage based on an inversion signal of the correction signal.

Moreover, it is preferable that the correction voltage generation means comprises: a correction signal generation circuit which detects a current flowing through the upper electrode at the time when the scanning voltage is applied to the lower electrode and outputs the current as a correction signal; and a correction voltage generation circuit which receives the correction signal from the correction signal generation circuit to generate the correction voltage based on the correction signal.

Also, it is preferable that the correction voltage generation means comprises: a correction signal generation circuit which detects a voltage at the upper electrode at the time when the scanning voltage is applied to the lower electrode and outputs the voltage as a correction signal; and a correction voltage generation circuit which receives the correction signal from the correction signal generation circuit to generate the correction voltage based on the correction signal.

According to the above-mentioned arrangement, when the electrode placed in the lower position farther from the detection pen out of the segment electrode and the common electrode constituting the display panel is scanned, a voltage is induced at the electrode in the upper position due to the scanning voltage applied to the electrode in the lower position.

In the above case, a correction voltage such that it cancels the voltage induced at the upper electrode is generated by the correction voltage generation means to be applied to the upper electrode. Therefore, the voltage induced at the upper electrode due to the scanning voltage applied to the lower electrode is canceled.

As a result, no induction noise due to the voltage induced at the upper electrode attributed to the scanning voltage applied to the lower electrode is superimposed on the output signal which is output through induction at the electrode of the detection pen electrostatically coupled with the segment electrode and the common electrode in the period when the lower electrode is scanned.

According to the aforementioned arrangement, digital correction data representing the waveform of an inversion signal of the voltage induced at the upper electrode attributed to the scanning voltage applied to the lower electrode is read from the internal memory of the correction signal generation circuit and transmitted as a correction signal to the correction voltage generation circuit. Then the correction voltage in an analog form is generated based on the correction signal from the correction signal generation circuit by the correction voltage generation circuit at least in the period when the lower electrode is scanned, and the correction voltage is then applied to the upper electrode.

Thus the voltage induced at the upper electrode attributed to the scanning voltage applied to the lower electrode is canceled.

According to the aforementioned arrangement, the correction signal generation circuit takes in a shift data signal for starting the scanning as input to the input terminal of the first stage of the shift register of either of the segment electrode drive circuit or the common electrode drive circuit for scanning the lower electrodes as well as a pulse signal output from the output terminal of the final stage of the above-mentioned shift register at the time of ending the scanning. Based on the shift data signal and the pulse signal, a binary correction signal having a pulse width substantially equal to the scanning period of the lower electrodes is generated. Then the generated binary correction signal is transmitted to the correction voltage generation circuit.

Then the correction voltage generation circuit generates the aforementioned analog correction voltage based on the correction signal from the correction signal generation circuit at least in the period when the lower electrode is scanned, and the correction voltage is applied to the upper electrode.

Thus the voltage induced at the upper electrode attributed to the scanning voltage applied to the lower electrode is canceled.

According to the aforementioned arrangement, the correction signal generation circuit detects a voltage induced at the auxiliary electrode facing the lower electrodes attributed to the scanning voltage applied to the lower electrode, and the voltage is transmitted as a correction signal to the correction voltage generation circuit.

Then the correction voltage generation circuit generates the aforementioned correction voltage based on the inversion signal of the correction signal from the correction signal generation circuit at least in the period when the lower electrode is scanned, and the correction voltage is applied to the upper electrode.

Thus the voltage induced at the upper electrode attributed to the scanning voltage applied to the lower electrode is canceled.

According to the aforementioned arrangement, the correction signal generation circuit detects the current through the upper electrode at the time when the scanning voltage is applied to the lower electrode, and a signal representing the current is transmitted as a correction signal to the correction voltage generation circuit.

Then the correction voltage generation circuit generates the correction voltage based on the correction signal from the correction signal generation circuit at least in the period when the lower electrode is scanned, and the correction voltage is applied to the upper electrode.

Thus the voltage induced at the upper electrode attributed to the scanning voltage applied to the lower electrode is canceled.

According to the aforementioned arrangement, the correction signal generation circuit detects the voltage at the upper electrode at the time when the scanning voltage is applied to the lower electrode, and the voltage is transmitted as a correction signal to the correction voltage generation circuit.

Then the correction voltage generation circuit generates the correction voltage based on the correction signal from the correction signal generation circuit at least in the period when the lower electrode is scanned, and the correction voltage is applied to the upper electrode.

Thus the voltage induced at the upper electrode attributed to the scanning voltage applied to the lower electrode is canceled.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 6 is a graph showing an input-output characteristic of the detection and hold circuit having an offset incorporation circuit;

FIG. 7 is a chart showing the waveforms of output signals of each circuit in the stage for removing noise from the x-coordinate detection signal;

FIG. 15 is a block diagram of a display-integrated type tablet device;

DETAILED DESCRIPTION OF THE PREFERRED EMBODIMENTS

The following describes the present invention based on its several embodiments with reference to the attached drawings.

<First embodiment>

Figure 1:
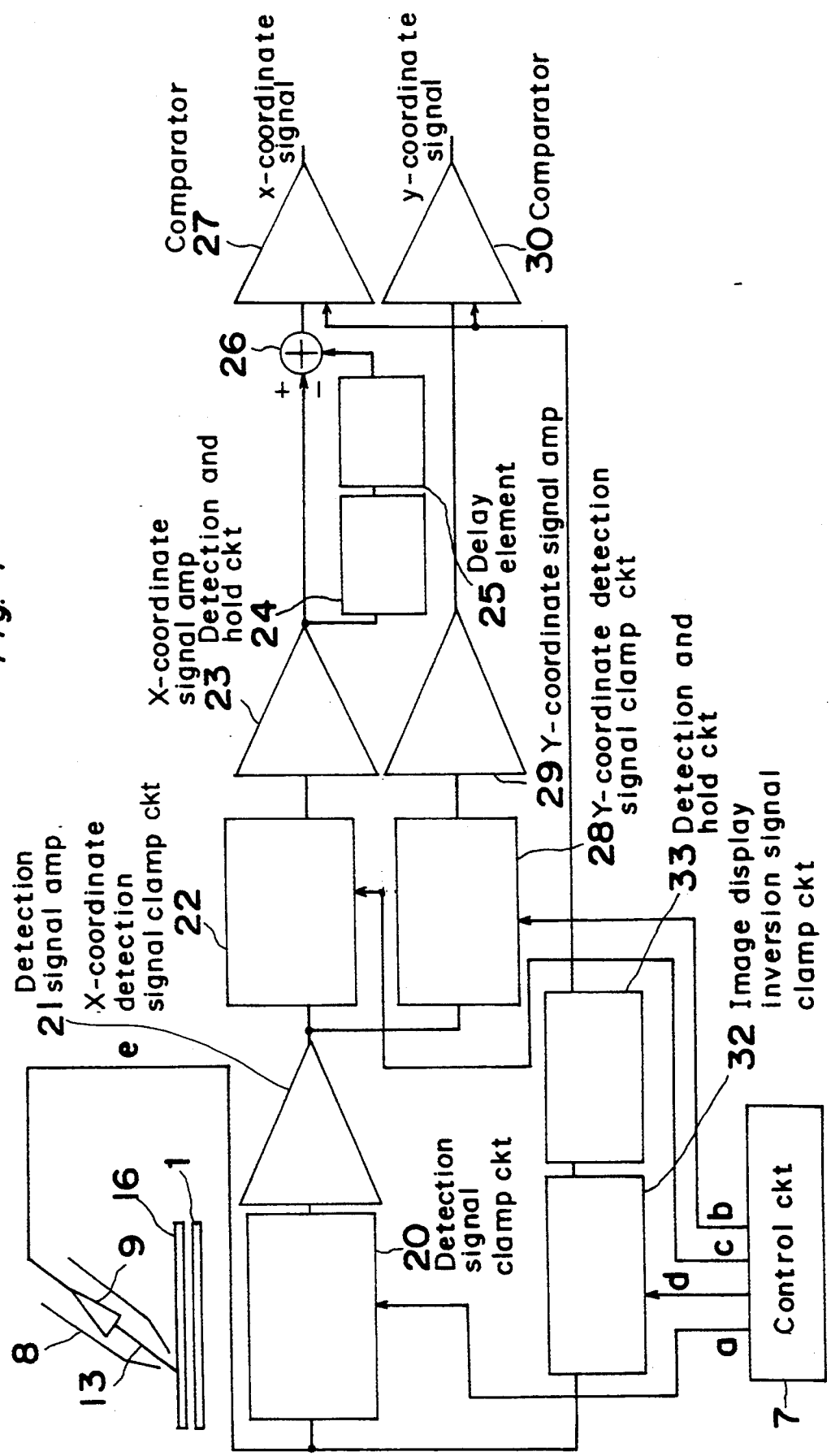
FIG. 1 is a block diagram of a coordinate detection system of a display-integrated type tablet device in accordance with an embodiment of the present invention.

FIG. 1 is a block diagram of a coordinate system of the display-integrated type tablet device of the first embodiment.

Referring to FIG. 1, there are included an LCD panel 1, a transparent protection panel 16, a detection electrode 13 of a detection pen 8, and an amplifier 9 built in the detection pen 8. There are further included a detection signal clamp circuit 20, a detection signal amplifier 21, an X-coordinate signal clamp circuit 22, an X-coordinate signal amplifier 23, a detection and hold circuit 24, a delay element 25, an adder 26, and a comparator 27. There are still further included a Y-coordinate signal clamp circuit 28, a Y-coordinate signal amplifier 29, a comparator 30, an image display inversion signal clamp circuit 32, a detection and hold circuit 33, and a control circuit 7.

Figure 2:
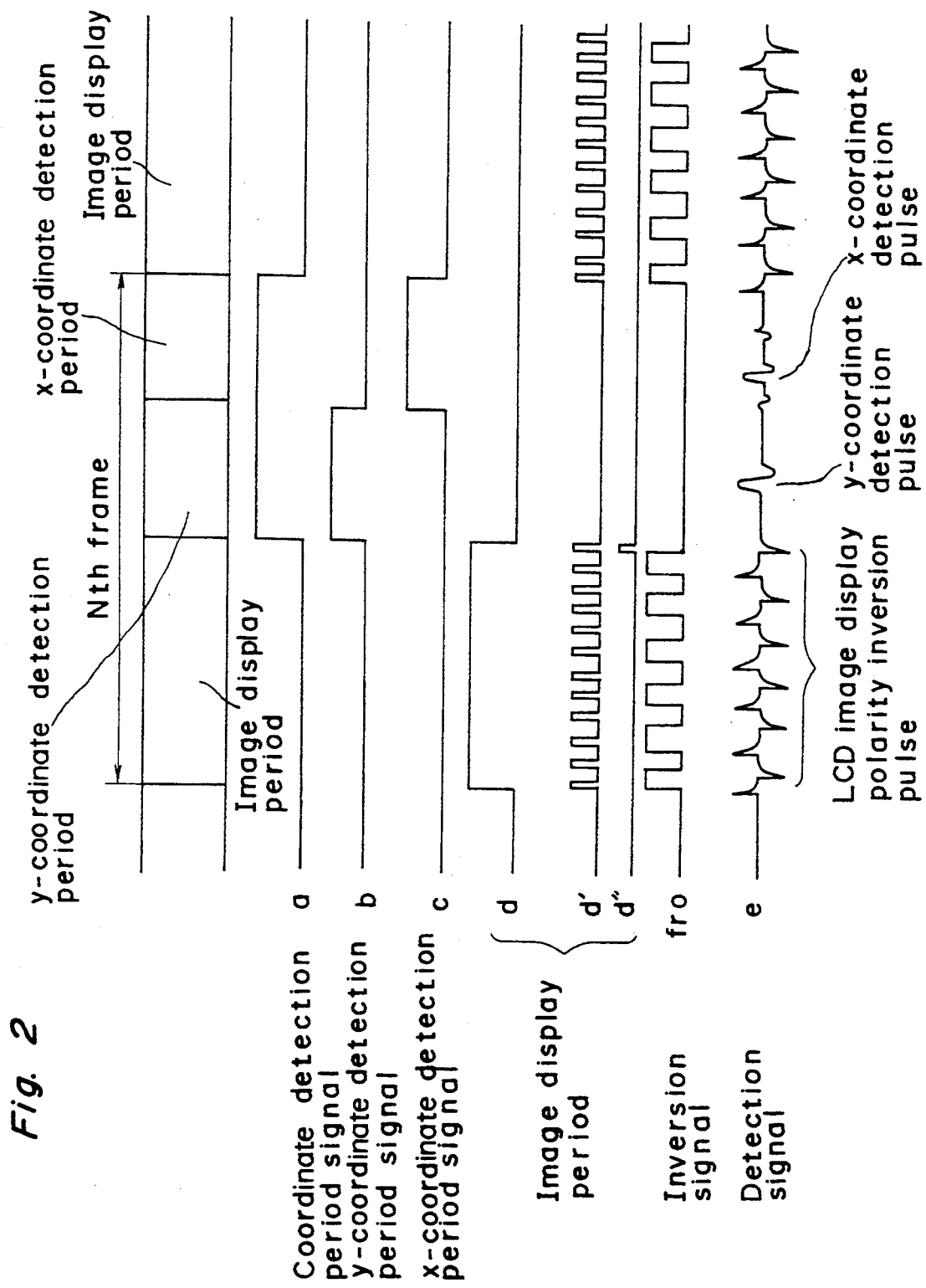
FIG. 2 is a timing chart of periodical signals output from a control circuit as shown in FIG. 1.

The control circuit 7 outputs a coordinate detection period signal a, a y-coordinate detection period signal b, an x-coordinate detection period signal c, and an image display period signal d according to a timing as shown in FIG. 2. Among the above-mentioned signals, the image display period signal d may be a signal d' which is made active only at the image display voltage inversion time, or may be a signal d" which is made active at the image display voltage inversion time just before the y-coordinate detection period signal b becomes active. A detection signal induced at the detection electrode 13 of the detection pen 8 is shown by a waveform e.

Figure 3A:
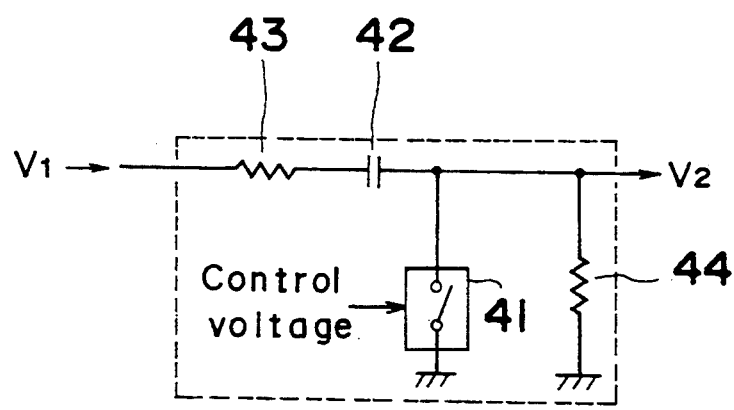
FIGS. 3(a) and 3(b) are exemplified circuit diagrams of a detection signal clamp circuit and an image display inversion signal clamp circuit as shown in FIG. 1.

The detection signal e which was induced at the detection electrode 13 of the detection pen 8 and amplified in the amplifier 9 is input to the detection signal clamp circuit 20 and the image display inversion signal clamp circuit 32 by way of a cable. The detection signal clamp circuit 20 and the image display inversion signal clamp circuit 32 are each composed of two resistors 43 and 44, one capacitor 42, and one voltage-controlled switch element 41 such as a transistor or a field-effect transistor as shown in FIG. 3(a). Also, the above clamp circuits 20 and 32 may be each constituted as shown in FIG. 3(b) and combined with an operational amplifier.

Figure 3B:
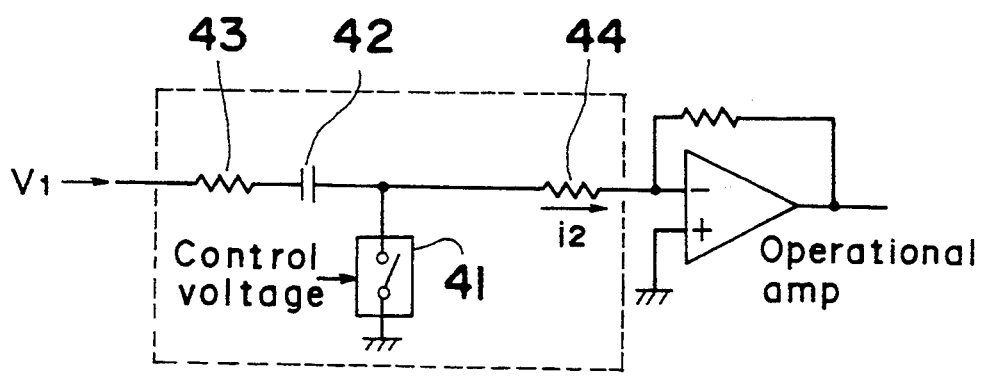
Figure 4A:
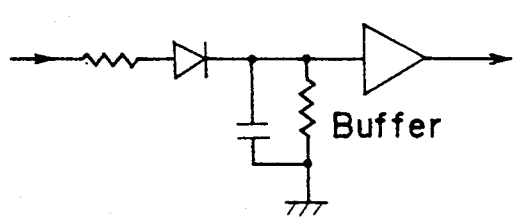
FIGS. 4(a), 4(b), 4(c) and 4(d) are exemplified circuit diagrams of peak hold circuits as a detection and hold circuit as shown in FIG. 1.
Figure 4B:
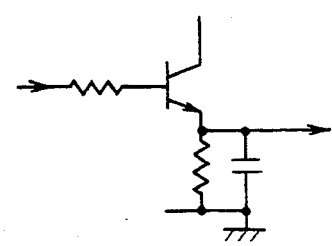
Figure 4C:
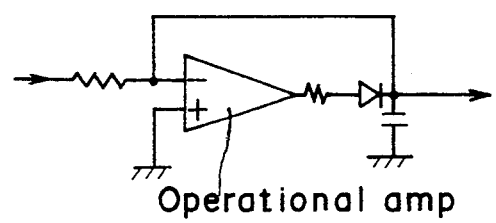
Figure 4D:
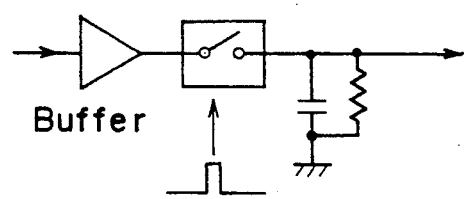

Referring to FIGS. 3(a) and 3(b), the voltage-controlled switch element 41 turns OFF to increase its impedance when an active control voltage of 5 V is input to its control terminal. The switch element 41 turns ON when a non-active control voltage of 0 V is input to the terminal.

While the control voltage is at 0 V, the voltage-controlled switch element 41 continues to be ON, and therefore a voltage $V_2$ as shown in FIG. 3(a) or a current $i_2$ as shown in FIG. 3(b) becomes "0", when the input voltage $V_1$ is utterly interrupted from the output side to allow the capacitor 42 to be charged or discharged. When the control voltage changes from 0 V to 5 V, the interruption between the input side and the output side is released, and the voltage $V_2$ or the current $i_2$ rises up from "0" by the charge in the capacitor 42 charged just in advance.

Figure 28:
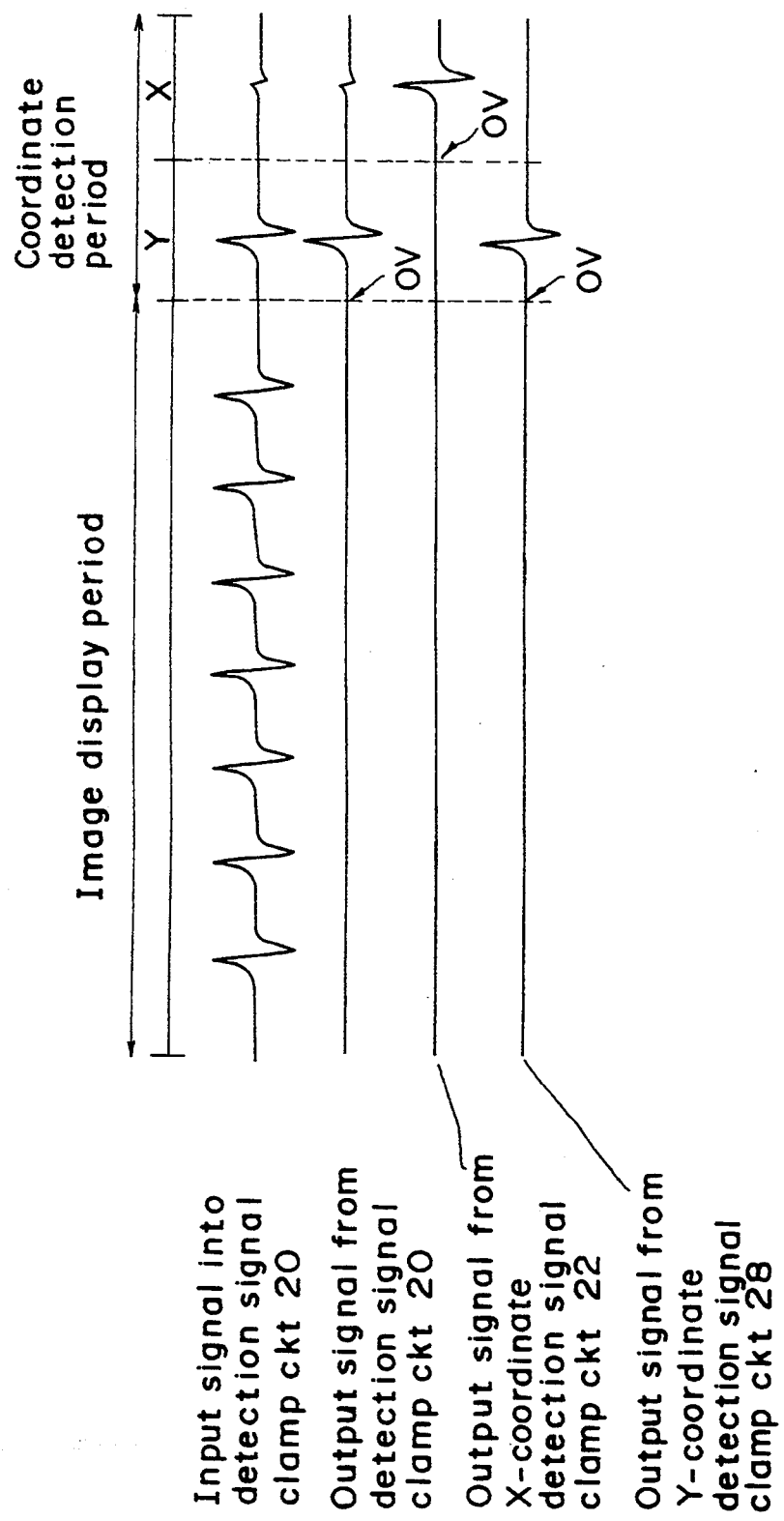
FIG. 28 is a timing chart of waveforms in each part of FIG. 1.

As shown in FIG. 2, the aforementioned LCD image display polarity inversion pulse, the y-coordinate detection pulse, and the x-coordinate detection pulse are timely close to each other. Furthermore, due to a high-pass filter effect attributed to a capacitive coupling between the detection electrode 13 of the detection pen 8 and the LCD panel 1, delay of low-frequency component of the previous signal is disadvantageously superimposed on the main signal component which is desired to be extracted. However, since the detection signal clamp circuit 20, the x-coordinate detection signal clamp circuit 22, the y-coordinate detection signal clamp circuit 28 and the image display inversion signal clamp circuit 32 are electrically equivalent to the circuit as shown in FIGS. 3(a) or 3(b), the input side and the output side in each clamp circuit 20, 22, 28 and 32 are electrically separated from each other when the voltage-controlled switch element 41 is ON. In that time, the output side of the capacitor 42 is fixed to the ground potential. Then, when the voltage-controlled switch element 41 changes from ON to OFF, the output signal V2 starts from 0 V due to the charge effect of the capacitor 42 and only the high-frequency component of the input signal V1 passes through. Thus, clamping operation is executed. In the case, the input and output signals of the detection signal clamp circuit 20, the output signal of the x-coordinate detection signal clamp circuit 22 and the output signal of the y-coordinate detection signal clamp circuit 28 are shown in FIG. 28.

To the control terminal of the voltage-controlled switch element 41 in the image display inversion signal clamp circuit 32 is applied the image display period signal d which becomes active only in the image display period as shown in FIG. 2. As a result, only the LCD image display polarity inversion pulse of the detection signal e as shown in FIG. 2 is passed to be transmitted to the detection and hold circuit 33 in the next stage.

Figure 5A:
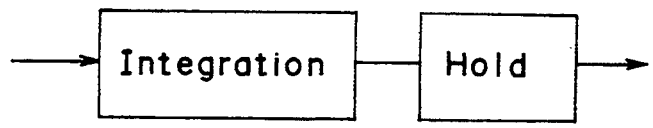
FIGS. 5(a) and 5(b) are exemplified circuit diagrams of average value detection and hold circuits as a detection and hold circuit as shown in FIG. 1.
Figure 5B:
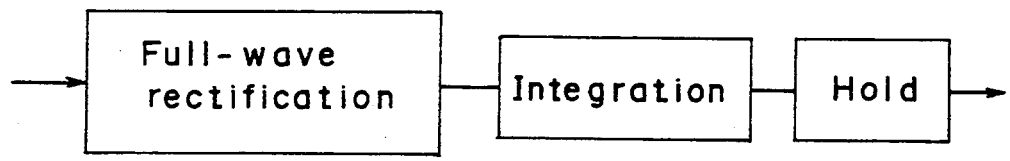

The detection and hold circuit 33 may be a peak hold circuit for detecting a peak value, or may be an average value detection and hold circuit including an integration function. Exemplified peak hold circuits are shown in FIGS. 4(a), 4(b), 4(c), and 4(d), and exemplified average value detection and hold circuits are shown in FIGS. 5(a) and 5(b).

In the above-mentioned detection and hold circuit 33, a DC voltage corresponding to the level of the LCD image display polarity inversion pulse is obtained and applied as a threshold voltage to an input terminal of the comparator 27 and the comparator 30 in the next stage.

Meanwhile, to the control terminal of the voltage-controlled switch element 41 in the detection signal clamp circuit 20 is applied a detection period signal a which becomes active only in the coordinate detection period as shown in FIG. 2. As a result, only the detection signal including the y-coordinate detection pulse and the x-coordinate detection pulse in the coordinate detection period is passed to be input to the detection signal amplifier circuit 21 in the next stage. Then the detection signal amplified in the detection signal amplifier circuit 21 is transmitted to the X-coordinate signal clamp circuit 22 and the Y-coordinate signal clamp circuit 28.

Since the y-coordinate detection period signal b as shown in FIG. 2 is applied to the control terminal of the electronic control switch element of the Y-coordinate signal clamp circuit 28, only the y-coordinate detection signal is passed. The signal is amplified in the Y-coordinate signal amplifier circuit 29 and supplied to the comparator 30.

In the above case, there is already applied a threshold voltage proportional to the magnitude of the LCD polarity inversion signal from the detection and hold circuit 33 to the other input terminal of the comparator 30 as described hereinbefore. Therefore, the comparator 30 outputs a y-coordinate signal having a positive pulse only when it detects a y-coordinate detection signal exceeding the threshold value.

In the same manner, the x-coordinate detection period signal c as shown in FIG. 2 is applied to the control terminal of the electronic control switch of the X-coordinate signal clamp circuit 22, and therefore only the x-coordinate detection signal is passed. Then the signal is amplified in the X-coordinate signal amplifier 23 and supplied to a positive input terminal of the adder 26 as a synthesis circuit and the detection and hold circuit 24.

The detection and hold circuit 24 has the same construction as that of the detection and hold circuit 33, and therefore a DC voltage according to the level of the x-coordinate detection signal is output.

It is noted that the detection and hold circuit 24 has an offset incorporation circuit having a deadband as shown in FIG. 6.

The output of the detection and hold circuit 24 is delayed by the delay element 25 and applied to a negative input terminal of the adder 26 to be added to the original x-coordinate detection signal.

Figure 27:
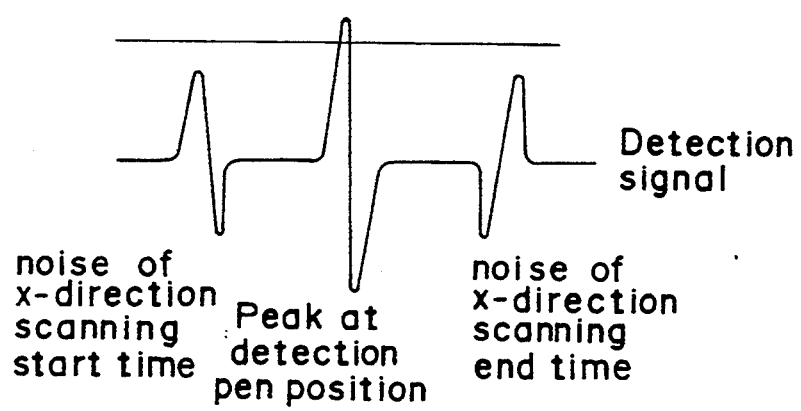
FIG. 27 is a chart of an exemplified x-coordinate detection signal.

FIG. 7 shows output signals output from the detection and hold circuit 24, the delay element 25, and the adder 26 in the case where an x-coordinate detection signal as shown in FIG. 27 is input to the detection and hold circuit 24. After detecting the x-coordinate detection pulse, the output signal from the adder 26 becomes a signal in which the noise component in the trailing portion of the pulse is suppressed in amplitude by a voltage corresponding to the level of the output signal from the detection and hold circuit 24 (i.e., the x-coordinate detection peak level).

Figure 29:
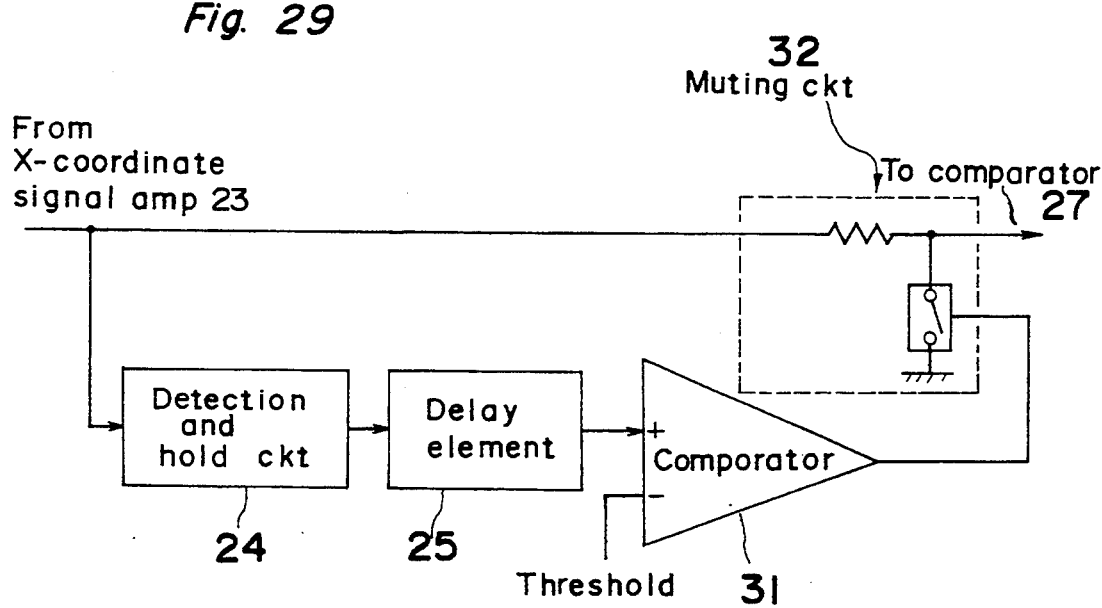
FIG. 29 is a diagram of an examplified circuit effecting a muting control based on an output of a delay element.

Referring to FIG. 29, the output of a delay element 25 is converted into a binary signal by a comparator 31.

Figure 30:
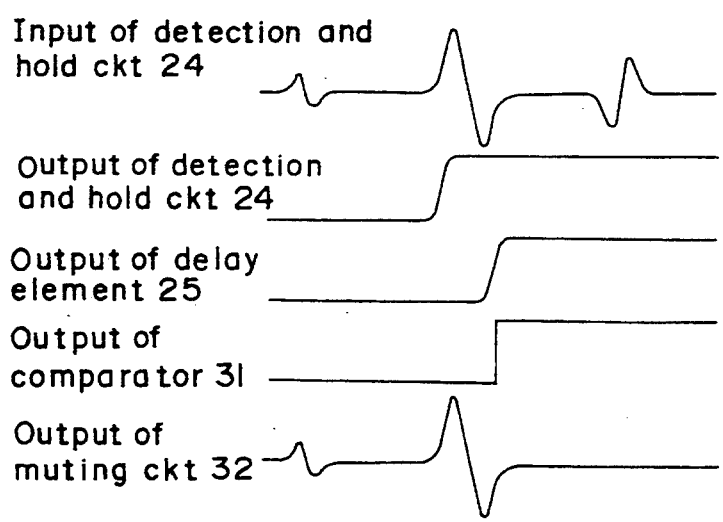
FIG. 30 is a chart showing waveforms in each part of FIG. 29.

The binary signal controls a muting circuit 32 as a digital control signal. As a result, the dip component following the peak in the output signal of the x-coordinate signal amplifier 23 can be ignored as understood from waveforms in FIG. 30.

The output of the adder 26 is input to an input terminal of the comparator 27. To the other input terminal of the comparator 27 is already applied a threshold voltage proportional to the magnitude of the LCD polarity inversion signal from the detection and hold circuit 33. Therefore, the comparator 27 outputs an x-coordinate signal having a positive pulse only when it detects an x-coordinate detection pulse exceeding the threshold value.

Figure 8:
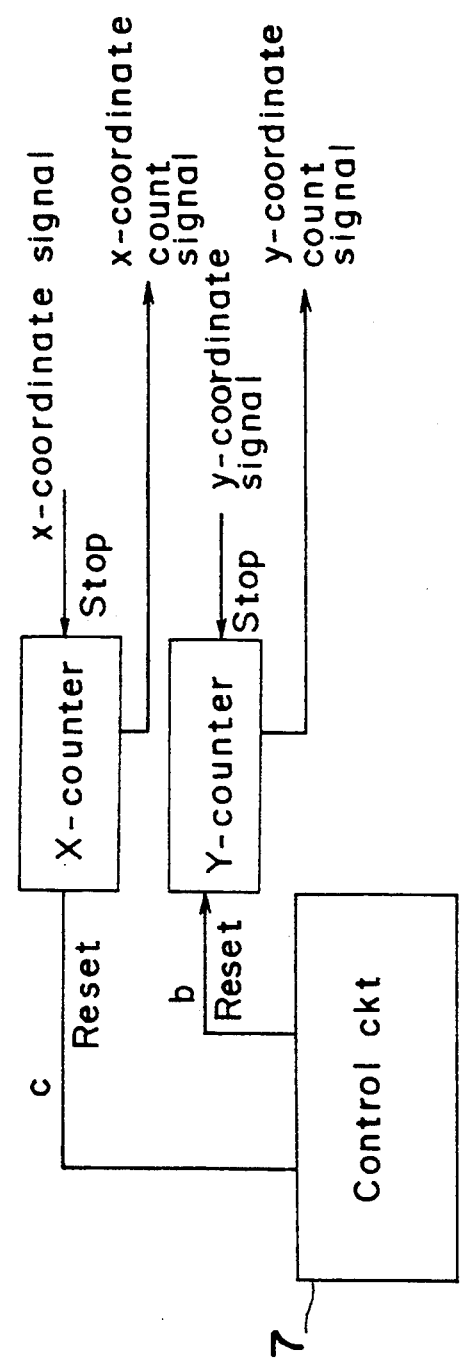
FIG. 8 is a diagram for explaining a logic circuit for obtaining an x-coordinate value and a y-coordinate value from an x-coordinate signal and a y-coordinate signal.

The x-coordinate pulse of the x-coordinate signal output from the comparator 27 and the y-coordinate pulse of the y-coordinate signal output from the comparator 30 are digital pulses where the position of the detection pen 8 on the tablet is reflected on a time. Therefore, by using a logic circuit such that, with a counter to be reset at the rise-time of the x-coordinate detection period signal c and the y-coordinate detection period signal b of the control circuit 7, the counting in the counter is stopped by the x-coordinate pulse of the x-coordinate signal or the y-coordinate pulse of the y-coordinate signal, the time of the x-coordinate pulse or the y-coordinate pulse can be obtained as a count value to consequently allow the position designated by the detection pen 8 on the LCD panel 1 to be known. FIG. 8 shows an example of such a logic circuit.

In the present embodiment as described above, the LCD image display polarity inversion pulse, the y-coordinate detection pulse, and the x-coordinate detection pulse are separated from the detection signal induced at the detection electrode 13 of the detection pen 8 by means of the detection signal clamp circuit 20, the image display inversion signal clamp circuit 32, the X-coordinate signal clamp circuit 22, and the Y-coordinate signal clamp circuit 28. With the above-mentioned arrangement, there can be input the LCD image display polarity inversion pulse to the detection and hold circuit 33, the x-coordinate detection pulse to the X-coordinate signal amplifier 23, and the y-coordinate detection pulse to the Y-coordinate signal amplifier 29 without any mutual interference.

Furthermore, a DC voltage corresponding to the level of the LCD image display polarity inversion pulse is obtained by the detection and hold circuit 33. Then the DC voltage is made to serve as a reference voltage in obtaining a binary pulse of the x-coordinate detection pulse or the y-coordinate detection pulse in the comparators 27 and 28.

In the above case, the LCD image display polarity inversion pulse changes according to the distance between the detection electrode 13 of the detection pen 8 and the segment electrode X and the common electrode Y. Therefore, the aforementioned reference voltage is also changed according to the above-mentioned distance. Consequently, the aforementioned reference voltage changes according to the distance. The above means that both the detection signal voltage and the reference voltage input to the comparators 27 and 28 change according to the distance between the detection pen 8 and the segment electrode X and the common electrode Y. As a result, the x-coordinate detection signal and the y-coordinate detection signal output from the comparators 27 and 28 become signals which are not dependent on the above-mentioned distance.

Furthermore, the detection and hold circuit 24, the delay element 25, and the adder 26 for detecting an x-coordinate detection pulse are incorporated to the x-coordinate detection circuit 10 to add the x-coordinate detection signal which has passed through the detection and hold circuit 24 and the delay element 25 to the original x-coordinate detection signal. As a result, when an x-coordinate detection pulse having the maximum intensity is detected, the subsequent noise component can be suppressed.

<Second embodiment>

Figure 9:
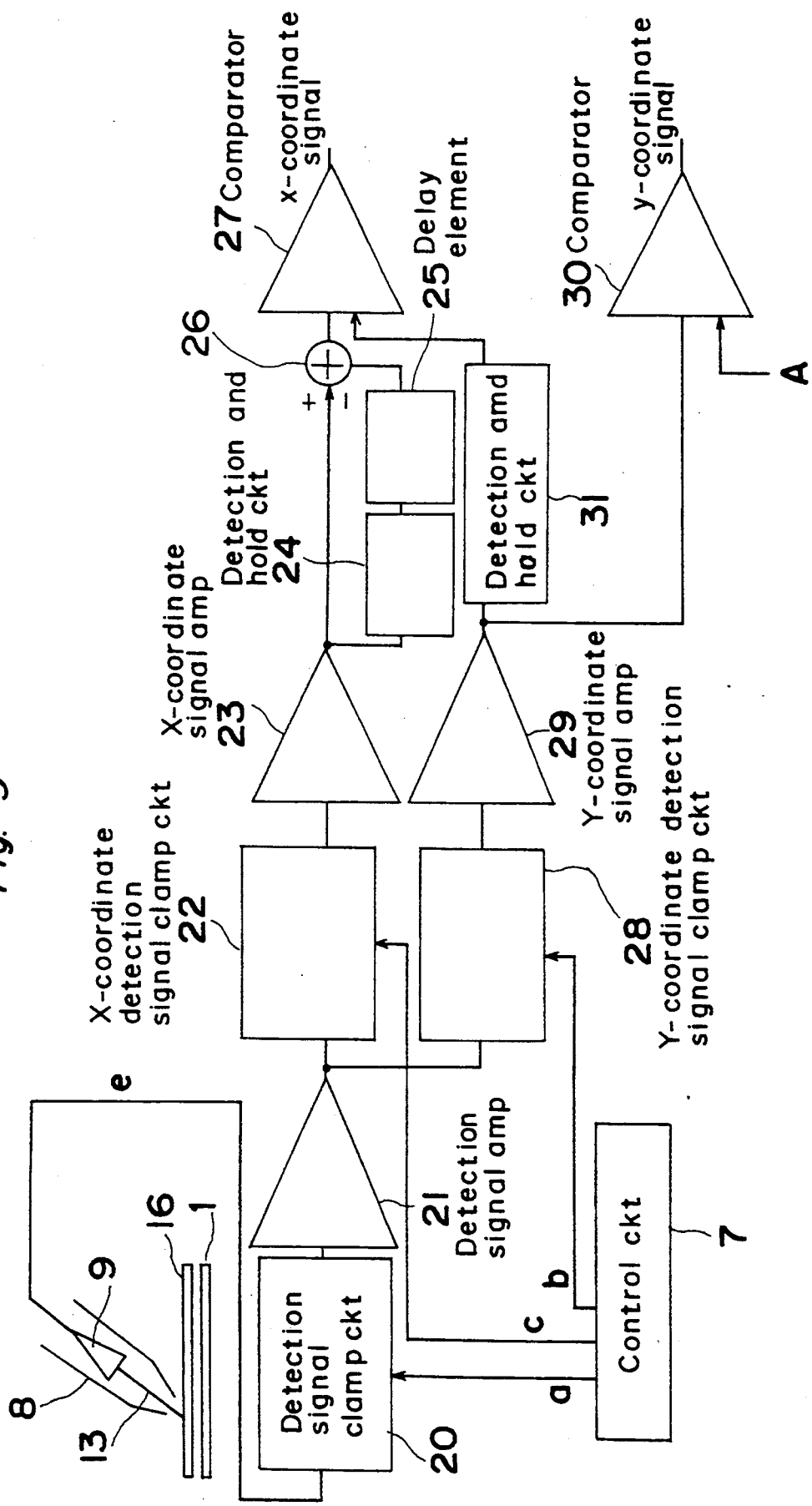
FIG. 9 is a block diagram of a coordinate detection system different from that shown in FIG. 1.

FIG. 9 is a block diagram of a coordinate detection system in the display-integrated type tablet device of the second embodiment. It is noted that the same parts and components as those in FIG. 1 are denoted by the same numerals, and no description is provided therefor herein.

Since the detection signal received from the common electrode located closer to the detection pen 8 has a high signal-to-noise ratio, a y-coordinate pulse having a sufficiently reduced error can be obtained even with a fixed threshold value. Therefore, by taking advantage of the above-mentioned fact, the circuit scale of the coordinate detection system of the first embodiment can be simplified.

It is noted that the second embodiment differs from the first embodiment in the following point. The point is that there is used a DC voltage proportional to the level of the y-coordinate detection pulse which is generated before the generation of the x-coordinate detection signal as a reference for the comparator 27 for x-coordinate detection signal. Therefore, the image display inversion signal clamp circuit 32 and the detection and hold circuit 33 for obtaining the DC voltage proportional to the level of the LCD image display polarity inversion pulse are eliminated, and a detection and hold circuit 31 is incorporated instead in the second embodiment.

The present invention is not limited to the above-mentioned arrangement. There is no problem even when the vertical positions of the common electrodes and the segment electrodes of the LCD panel 1 are exchanged, the sequence in time of the y-coordinate detection period and the x-coordinate detection period are exchanged, and the x-coordinate detection circuit and the y-coordinate detection circuit as shown in FIG. 9 are exchanged.

As apparent in the above description, the display-integrated type tablet device of the present invention scans the upper electrodes located closer to the detection pen out of the segment electrode and the common electrode under the control of the detection control circuit in the first scanning period to detect and hold the voltage variation quantity of the upper electrodes according to the output signal from the detection pen in the above time and output a reference signal corresponding to the above-mentioned voltage variation quantity. Then the coordinate detection circuit relevant to the lower electrodes out of the aforementioned x-coordinate detection circuit and the y-coordinate detection circuit detects a coordinate detection pulse contained in the output signal from the detection pen based on the aforementioned reference signal. Therefore, the detection level of the coordinate detection pulse relevant to the lower electrode susceptible to external noise can be changed based on the voltage variation quantity at the time of scanning the upper electrodes.

Therefore, according to the present invention, the variation of the output signal from the detection pen attributed to the change of the distance between the detection electrode of the detection pen and the segment electrode and the common electrode can be appropriately corrected to allow a high-accuracy coordinate detection to be achieved.

Furthermore, the display-integrated type tablet device of the present invention detects and holds the voltage variations of the segment electrode and the common electrode by means of the detection circuit according to the output signal from the detection pen to output a reference signal corresponding to the above-mentioned voltage variation in the image display period. Then the x-coordinate detection circuit and the y-coordinate detection circuit detect the coordinate detection pulse contained in the output signal from the detection pen based on the above-mentioned reference signal. Therefore, in both the x-coordinate detection circuit and the y-coordinate detection circuit, the variation of the output from the detection pen can be corrected more appropriately.

Furthermore, the display-integrated type tablet device of the present invention detects and holds the coordinate detection pulse contained in the output signal from the detection pen by means of the detection circuit, delays the resulting pulse for a specified period by means of the delay circuit, and synthesizes the detection signal from the delay circuit and the detection signal from the detection pen by means of the synthesis circuit. Therefore, the noise component following the peak of the coordinate detection pulse in the detection signal can be suppressed to allow the coordinate detection accuracy to be increased.

Furthermore, by virtue of the three clamp circuits operating in synchronization respectively with the image display period, segment electrode scanning period, and the common electrode scanning period, the display-integrated type tablet device of the present invention takes in the output signal from the detection pen in the aforementioned three periods. Therefore, the image display voltage inversion pulse, the x-coordinate detection pulse, and the y-coordinate detection pulse can be prevented from interfering with each other inside the x-coordinate detection circuit and the y-coordinate detection circuit to allow the coordinate detection accuracy to be increased.

<Third embodiment>

It is noted that the segment electrode is placed under the common electrode in the display-integrated type tablet device of a third embodiment of the present invention. It is further noted that the common electrode drive circuit, segment electrode drive circuit, switching circuit, display control circuit, detection control circuit, control circuit, detection pen, amplifier, x-coordinate detection circuit, y-coordinate detection circuit, DC power supply circuit, and the like of the display-integrated type tablet device of the present embodiment are the same as those of the display-integrated type tablet device as shown in FIG. 15.

Figure 10A:
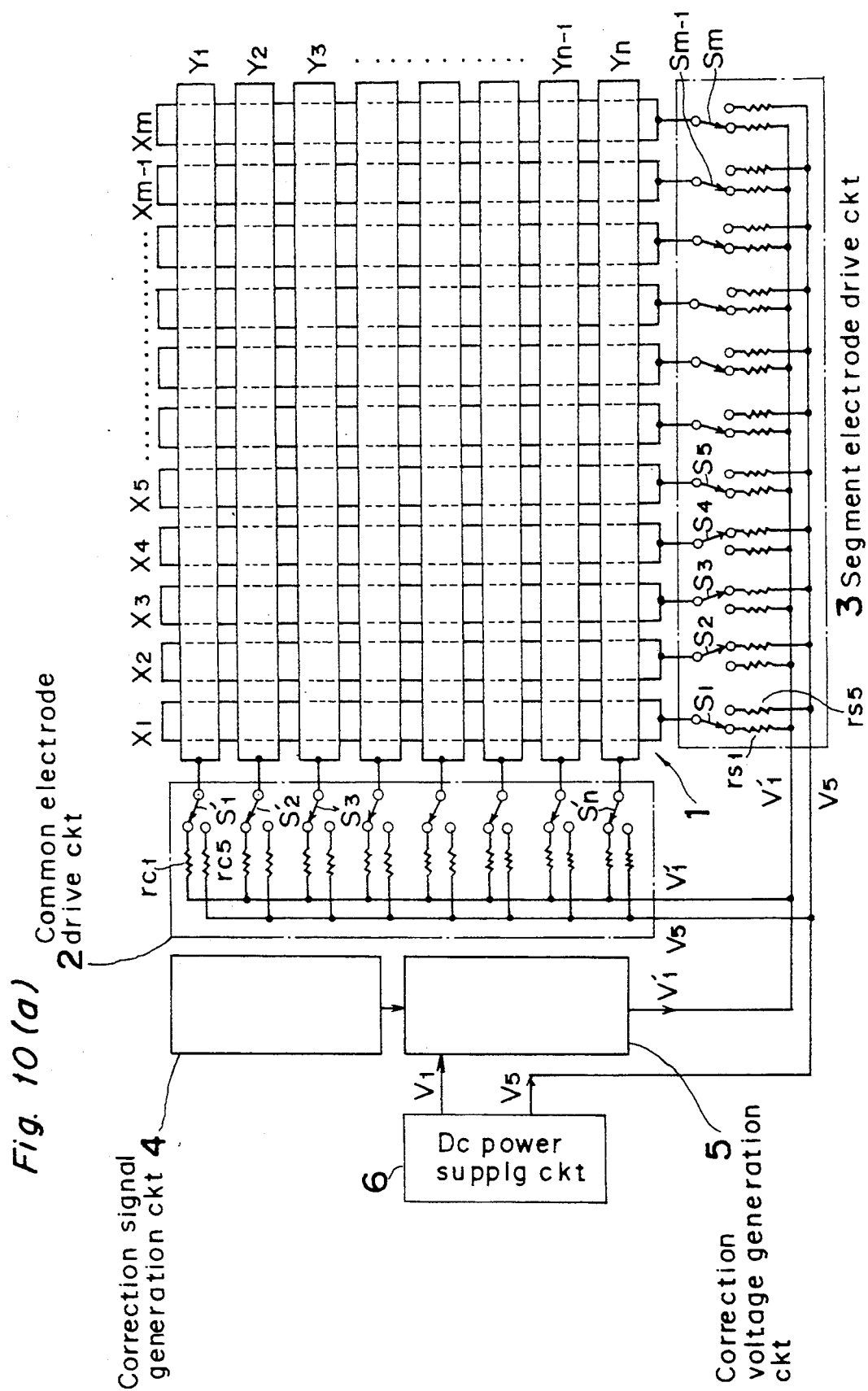
FIGS. 10(a) and 10(b) are a diagram showing the equivalent circuits of a segment electrode drive circuit and a common electrode drive circuit and a power supply system for use in a display-integrated type tablet device of the present invention.

FIG. 10(a) is a diagram showing the LCD panel, segment electrode drive circuit, common electrode drive circuit, and power supply system of the present third embodiment.

Figure 19:
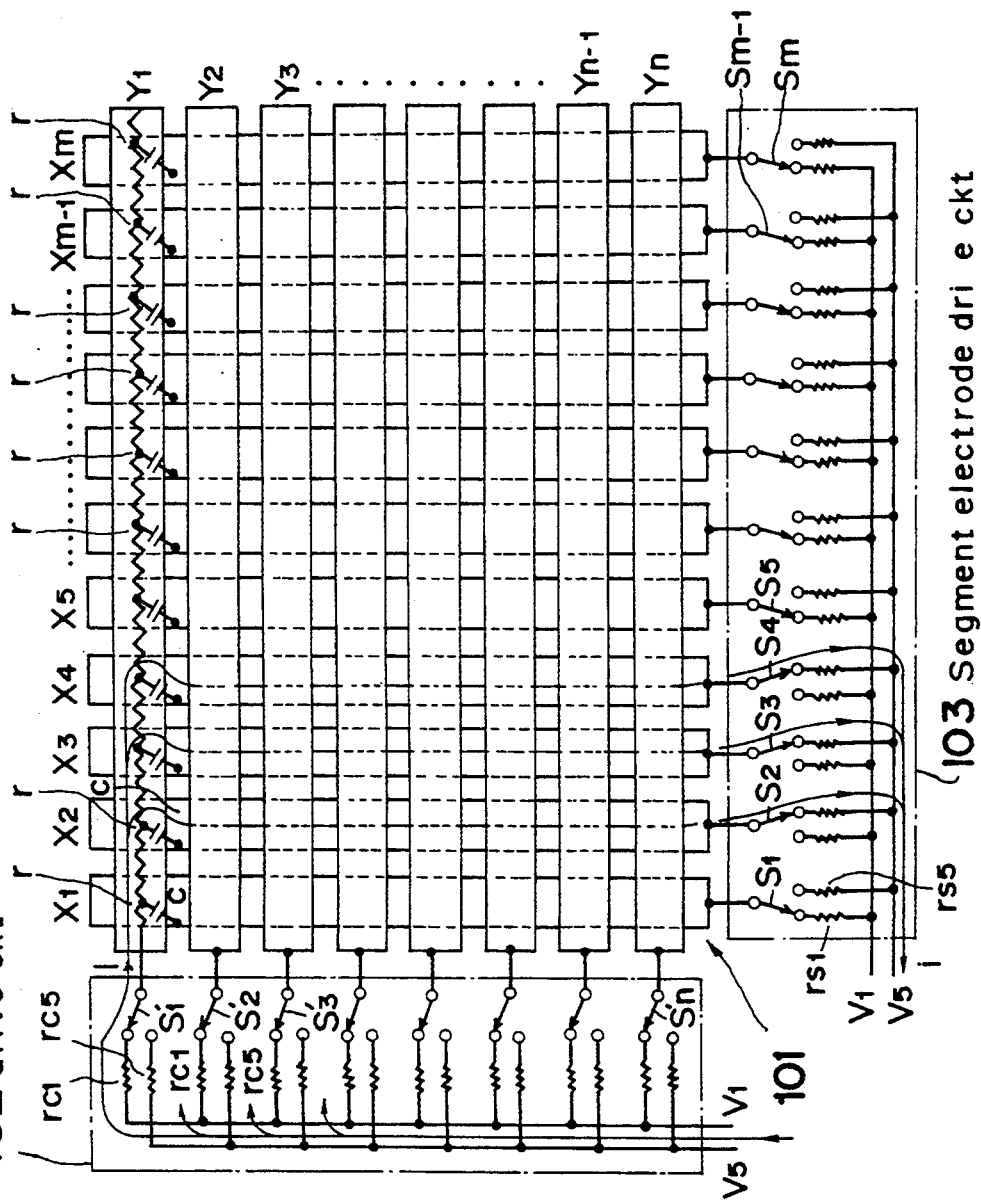
FIG. 19 is a diagram of equivalent circuits of a segment electrode drive circuit and a common electrode drive circuit in the display-integrated type tablet device as shown in FIG. 15.
Figure 20:
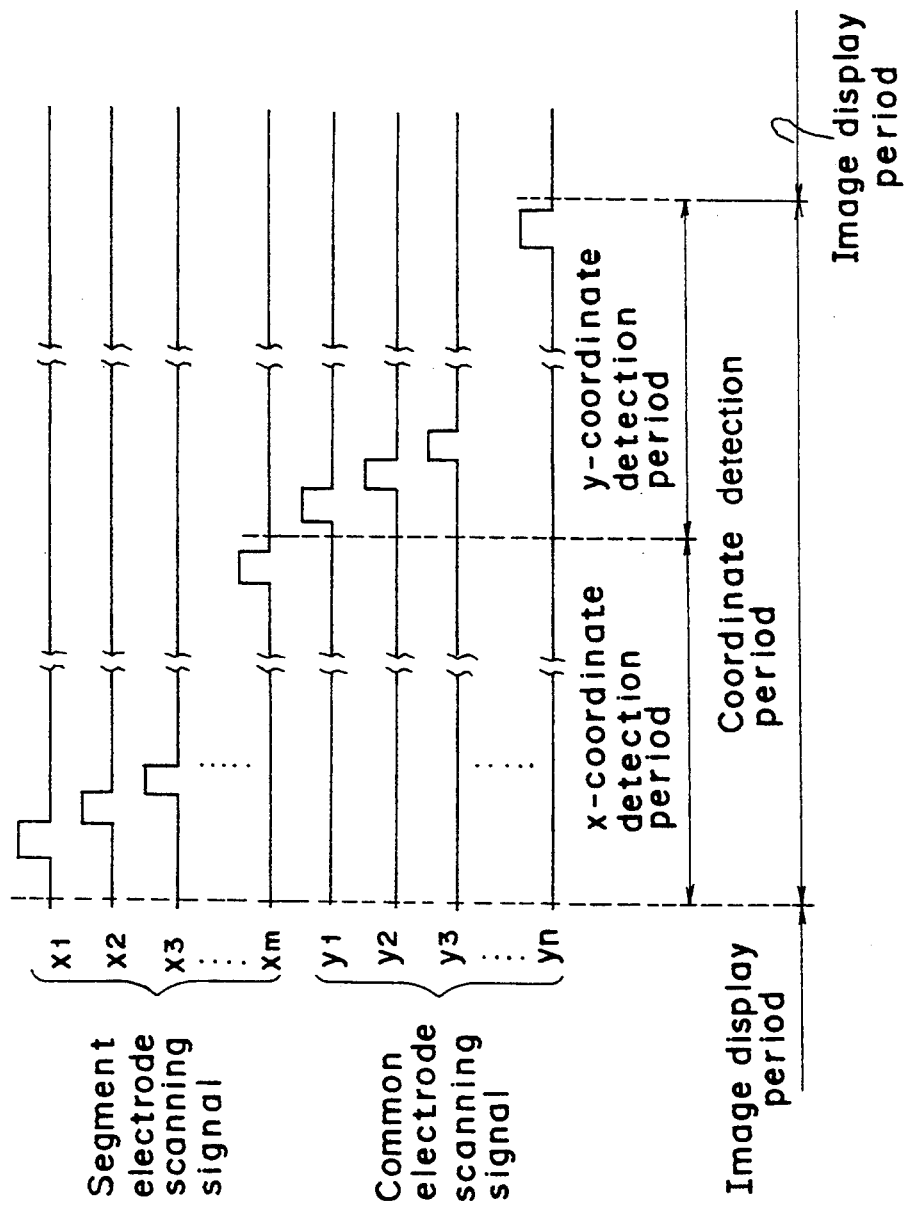
FIG. 20 is a timing chart of a segment electrode scanning signal and a common electrode scanning signal in the display-integrated type tablet device as shown in FIG. 15.
Figure 21:
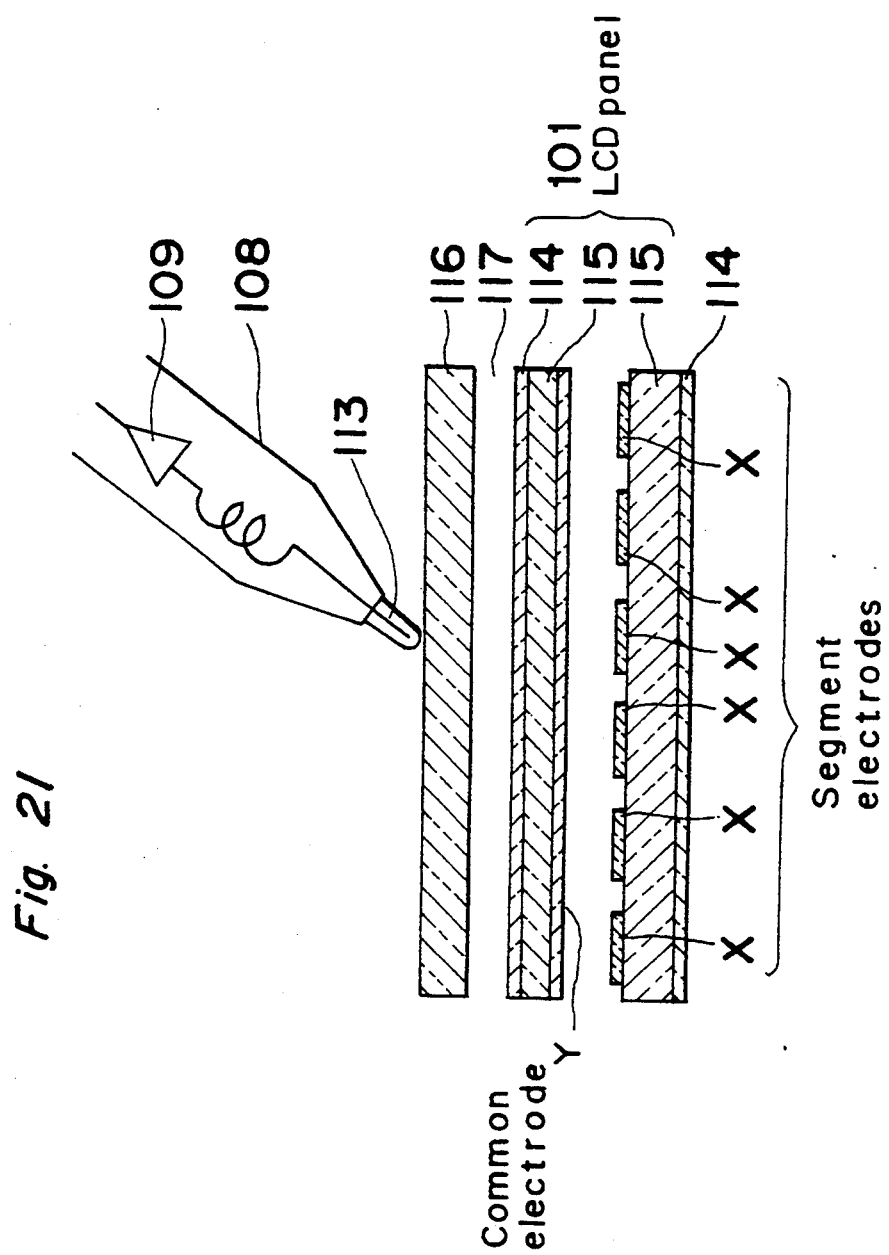
FIG. 21 is a diagram for explaining a relation in position between the LCD panel and the detection pen.
Figure 22:
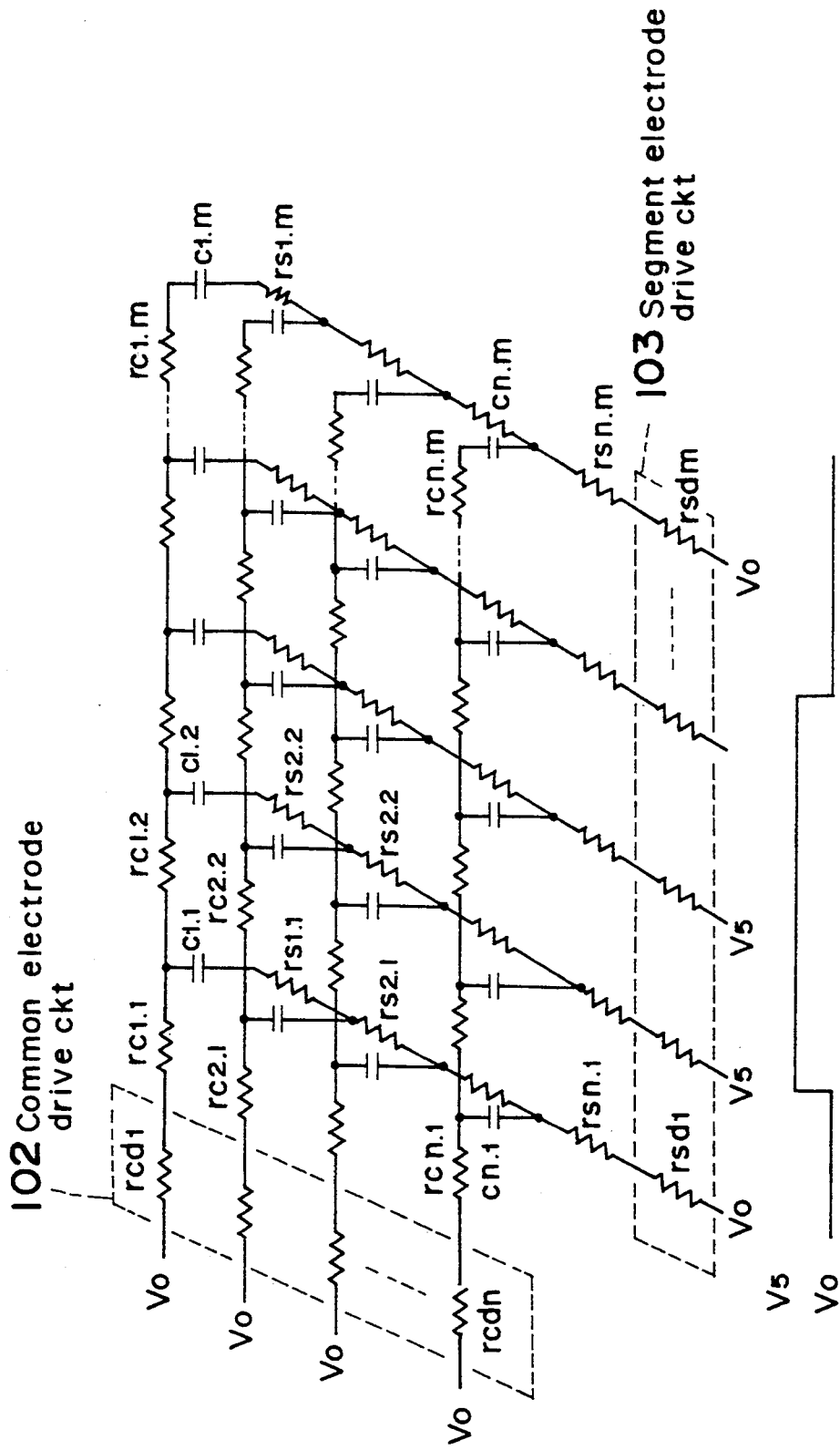
FIG. 22 is an equivalent circuit diagram of the LCD panel.
Figure 23:
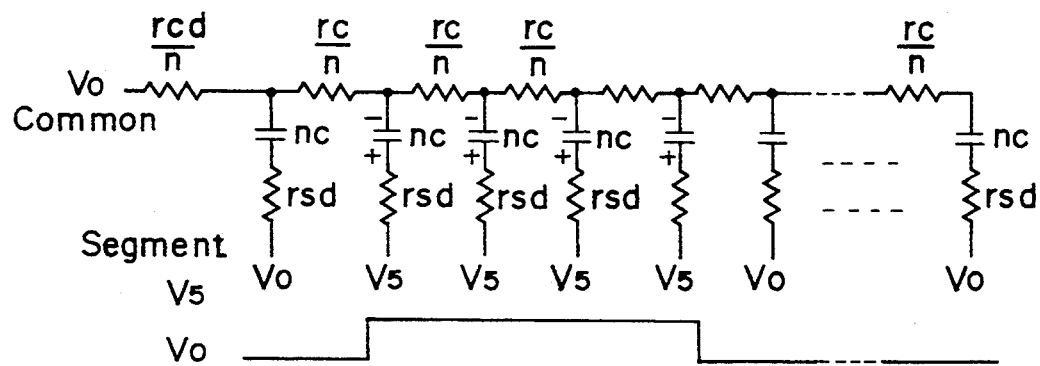
FIG. 23 is a simplified equivalent circuit diagram of the circuit as shown in FIG. 22.
Figure 24:
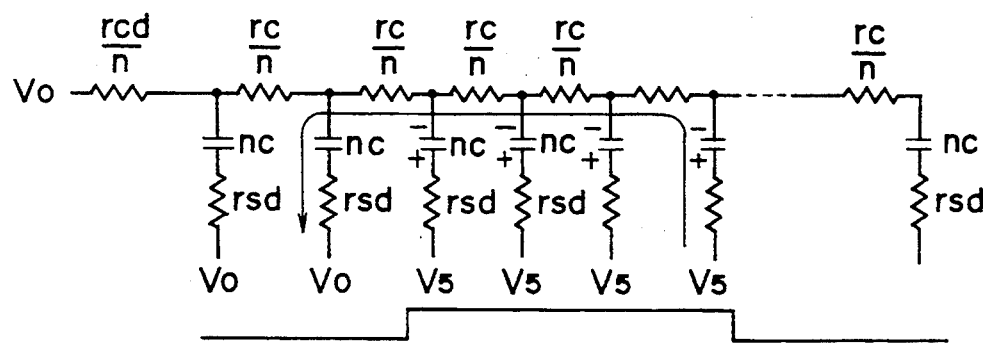
FIG. 24 is a diagram of a condition of the circuit shown in FIG. 23 where the segment electrode scanning is advanced by one clock pulse.
Figure 25:
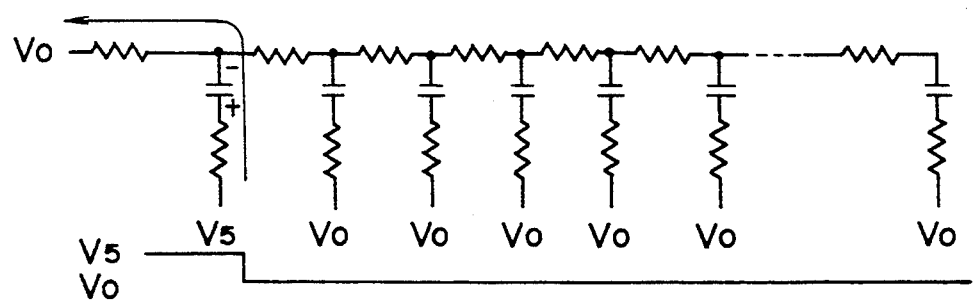
FIG. 25 is a diagram of a condition of the circuit shown in FIG. 23 at the time of starting the scanning of the segment electrode.
Figure 26:
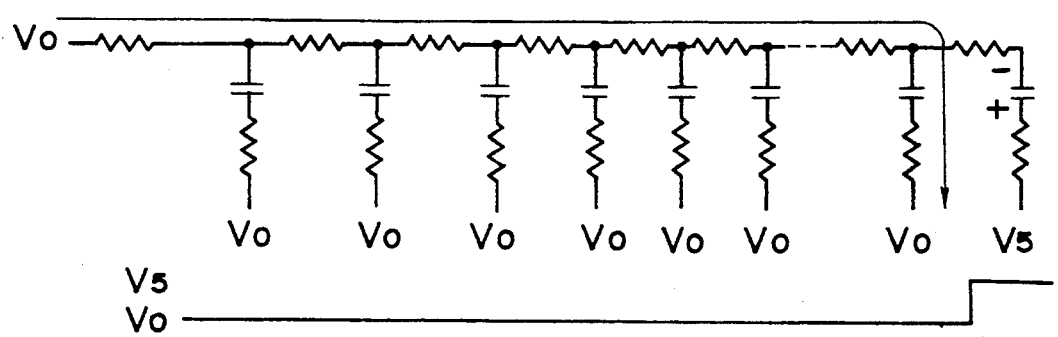
FIG. 26 is a diagram of a condition of the circuit shown in FIG. 23 at the time of ending the scanning of the segment electrode.

The common electrode drive circuit 2 and the segment electrode drive circuit 3 shown in FIG. 10(a) have the same equivalent circuits as those of the common electrode drive circuit 102 and the segment electrode drive circuit 103 as shown in FIG. 19. It is noted that the power to the common electrode drive circuit 2 and the segment electrode drive circuit 3 of the present third embodiment is supplied in the following manner.

The DC power supply circuit 6 supplies bias power sources $V_0$ through $V_5$ in the same manner as the DC power supply circuit 112 shown in FIG. 15. The bias power source $V_5$ from the DC power supply circuit 6 is supplied to each on-resistor $r_{c5}$ of the common electrode drive circuit 2 and to each on-resistor $r_{s5}$ of the segment electrode drive circuit 3. Meanwhile, the bias power source $V_1$ from the DC power supply circuit 6 is supplied to a correction voltage generation circuit 5.

Figure 13:
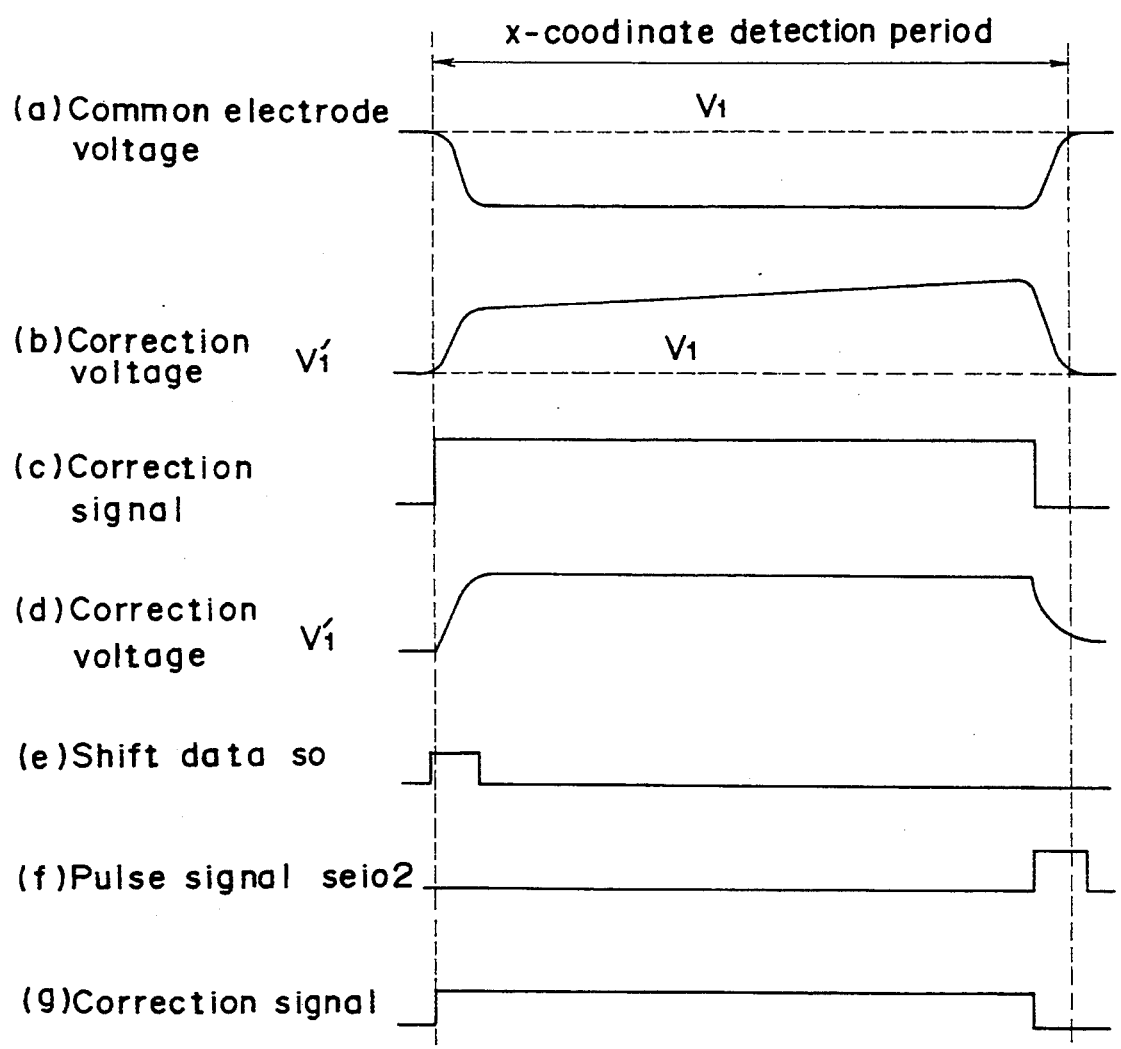
FIGS. 13 is a chart of exemplified correction signal and correction voltage.

The correction voltage generation circuit 5 generates a correction voltage $V_{1'}$ based on the correction signal input from a correction signal generation circuit 4. The correction voltage $V_{1'}$ is a voltage for correcting a shift of a voltage generated at the common electrode Y placed in the upper position attributed to the scanning voltage $V_5$ applied to the segment electrode X in the time of scanning the segment electrode X placed in the lower position, the voltage shifting toward the scanning voltage $V_5$ as shown by a waveform (a) in FIGS. 13 (same as the waveform (a) in FIG. 18). Therefore, the correction voltage has a waveform as shown in FIG. 13(b) which is an inversion in polarity of the waveform (a) shown in FIG. 13.

The correction voltage $V_{1'}$ from the correction voltage generation circuit 5 is supplied to each on-resistor $r_{c1}$ of the common electrode drive circuit 2 and to each on-resistor $r_{s1}$ of the segment electrode drive circuit 3.

The reason why the correction voltage $V_{1'}$ is supplied not only to the on-resistor $r_{c1}$ of the common electrode drive circuit 2 but also to the on-resistor $r_{s1}$ of the segment electrode drive circuit 3 is as follows. The above arrangement is adopted so as to prevent, in the x-coordinate detection period, the generation of any voltage difference between all the common electrodes Y to which the correction voltage $V_{1'}$ is applied in the non-scanning state and the segment electrode X (segment electrodes $X_1, X_5, \ldots, X_m$ in FIG. 10(a)) in the scanning state.

It is noted that the difference between the non-scanning voltage $V_1$ and the correction voltage $V_{1'}$ is small, and there is almost no problem even when the non-scanning voltage $V_1$ is supplied to each on-resistor $r_{s1}$ of the segment electrode drive circuit 3.

The correction signal output from the correction signal generation circuit 4 may be an analog signal or a digital signal. When the correction signal is an analog signal, the correction voltage generation circuit 5 is required to be composed of, for example, an operational amplifier to merely amplify the power of the analog correction signal. When the correction signal is a digital signal, the correction voltage generation circuit 5 is required to be composed of a digital-to-analog converter or a resistor and a capacitor to effect an approximation correction through a waveform shaping of the input digital correction signal.

The following describes examples of the correction signal generation circuit 4 and the correction voltage generation circuit 5.

Figure 10B:
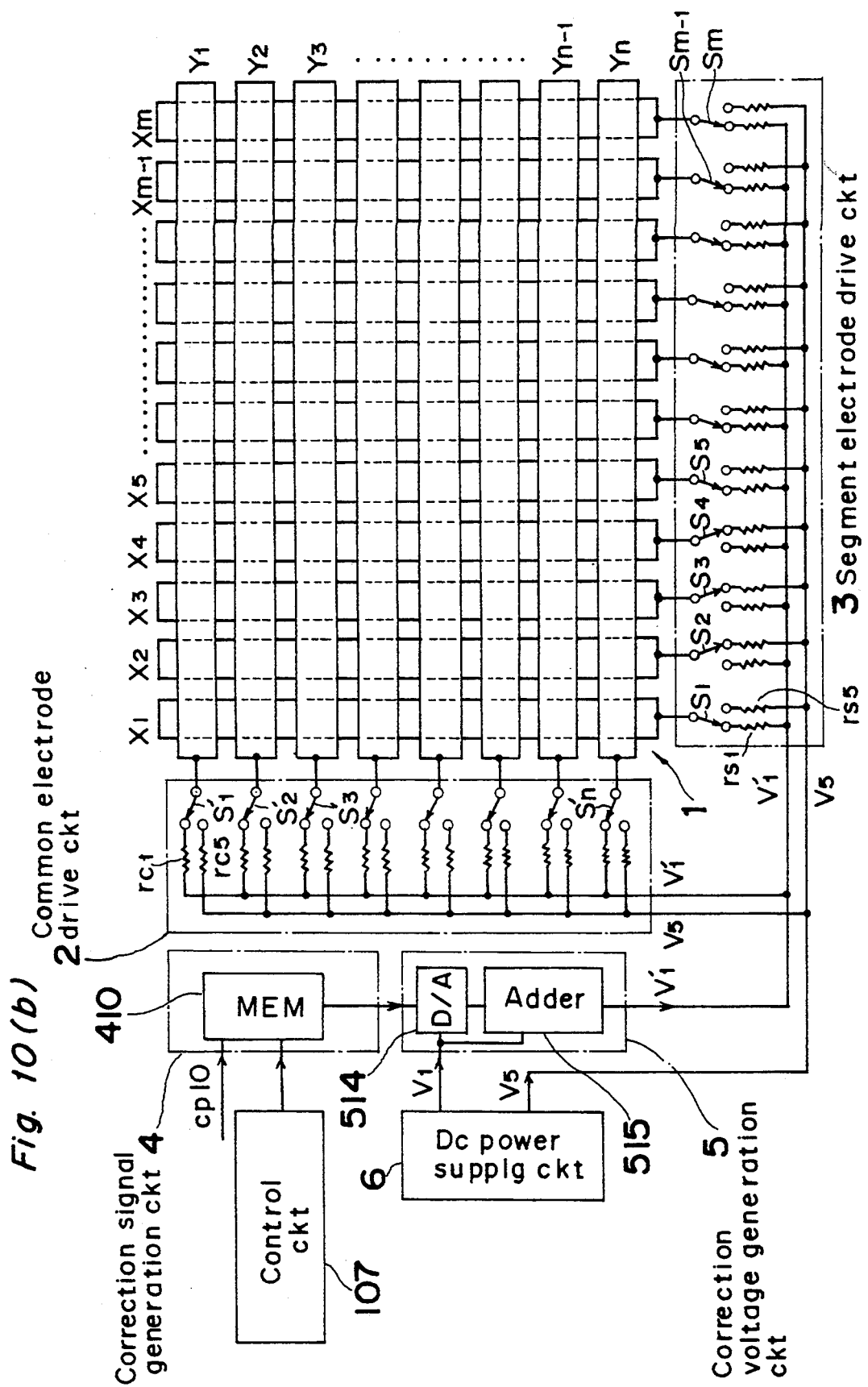

Referring to FIG. 10(b), in the correction signal generation circuit 4 of the present third embodiment, correction data formed by expressing the waveform of the correction voltage $V_{1'}$ (reference voltage=0) by a digital value (the correction data obtained through an analog-to-digital conversion of the analog waveform (b) in FIG. 13) is preliminarily stored in an internal memory 410 such as a ROM (Read Only Memory) or a RAM (Random Access Memory). When data processing enters into the x-coordinate detection period set by the control circuit 107 for scanning the segment electrode X placed in the lower position, the correction signal generation circuit 4 reads out the correction data from the internal memory 410 and transmits the signal as a correction signal to the correction voltage generation circuit 5.

Then the correction voltage generation circuit 5 subjects the correction signal (correction data) from the correction signal generation circuit 4 to a digital-to-analog conversion with a digital-to-analog (D/A) convertor 514 and superimpose the resulting signal on the bias power source $V_1$ from the DC power supply circuit 6 by an adder 515 to consequently obtain the correction voltage $V_{1'}$ having a waveform (b) in FIG. 13.

In the present third embodiment as described above, the digital data (correction data) of the waveform of the correction voltage $V_{1'}$ is preliminarily stored in the internal memory 410 of the correction signal generation circuit 4. Then in the x-coordinate detection period, the correction data is subjected to a digital-to-analog conversion in the D/A convertor 514 of the correction voltage generation circuit 5 to be superimposed on the bias power source $V_1$ to thereby obtain the correction voltage $V_{1'}$. Then the obtained correction voltage $V_{1'}$ is applied as a non-scanning voltage to the common electrode Y in the non-scanning state.

Therefore, according to the third embodiment, the voltage induced at the common electrode Y attributed to the scanning voltage $V_5$ applied to the segment electrode X is canceled in the x-coordinate detection period to detect no induction noise at the detection electrode of the detection pen to thereby allow the coordinate detection accuracy to be increased.

As a simple modification of the third embodiment, a digital value of a binary signal waveform having a pulse width substantially equal to the entire x-coordinate detection period as shown by a waveform (c) in FIG. 13 is stored in the internal memory 410 of the correction signal generation circuit 4. Then the correction voltage generation circuit 5 converts the binary signal waveform (c) shown in FIG. 13 into a voltage waveform similar to a waveform (b) shown in FIG. 13 by means of a circuit composed of a combination of a capacitance C and a resistance R (not shown) (referred to as the "CR circuit" hereinafter). The resulting signal is then superimposed on the bias power source $V_1$ from the DC power supply circuit 6 to thereby obtain the correction voltage $V_{1'}$ having a waveform (d) shown in FIG. 13.

Strictly describing the above case, the correction voltage $V_{1'}$ differs in each display-integrated type tablet device, and therefore it is required to store different correction data for each display-integrated type tablet device. However, in practical cases, it is sufficient to obtain a distribution of the correction voltages $V_{1'}$ of all the display-integrated type tablet devices and store an average correction voltage $V_{1'}$ as a correction value in the internal memory 410.

It is noted that, when a high-accuracy correction voltage $V_{1'}$ is necessary, it is required to store correct correction data in each display-integrated type tablet device. In such a case, it is sufficient to store correction data corresponding to each common electrode Y in a flash memory or an E²ROM (Electrically Erasable ROM) or the like.

<Fourth embodiment>

Figure 11:
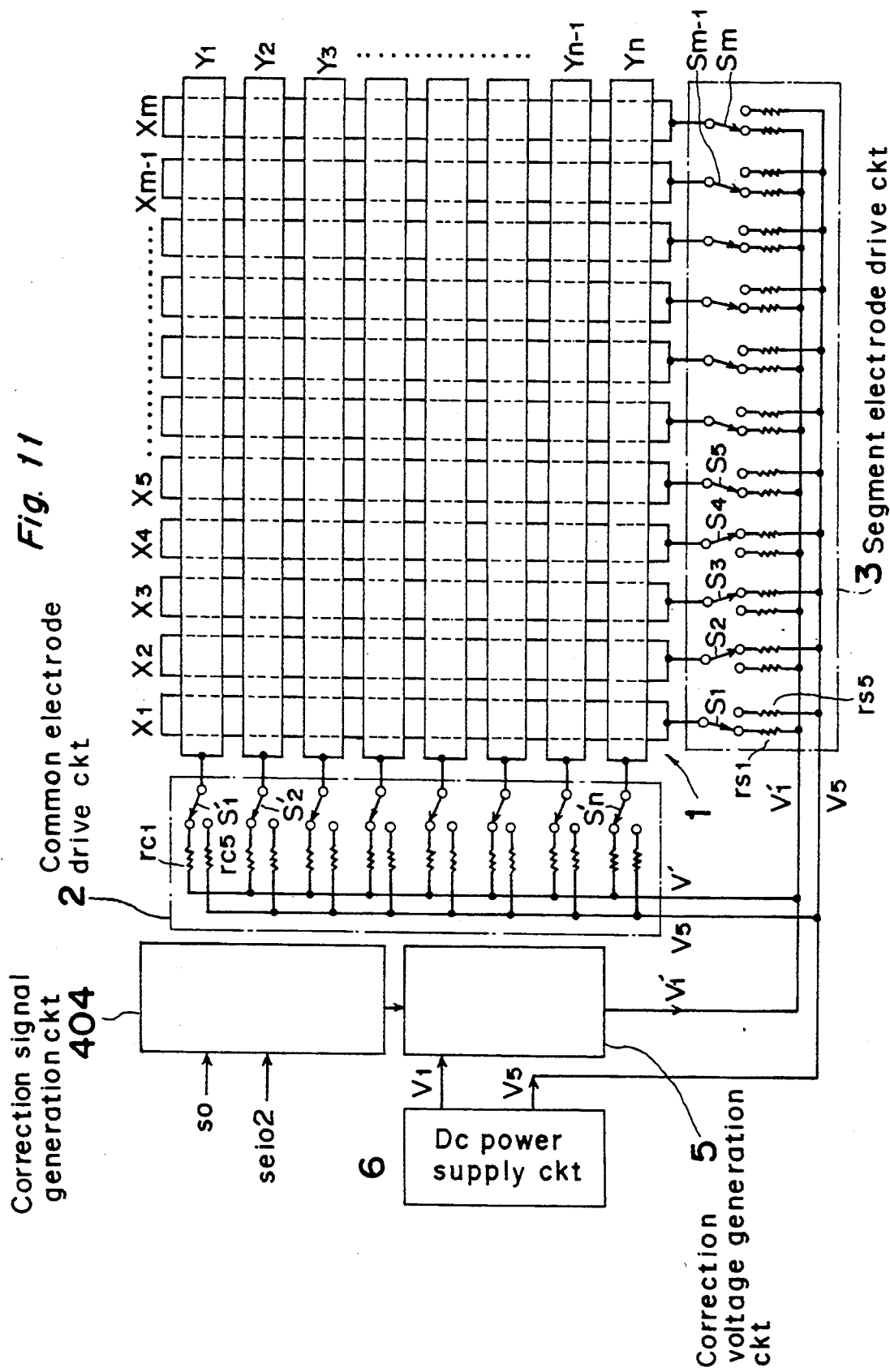
FIG. 11 is a diagram showing an example of the power supply system as shown in FIG. 10.

Referring to FIG. 11, a fourth embodiment differs from the third embodiment in the correction signal generation circuit 404. In the correction signal generation circuit 404 of the fourth embodiment, shift data so from the switching circuit 104 (refer to FIG. 15) and a pulse signal seio2 (refer to FIG. 15) output from an output terminal EIO2 of the segment electrode drive circuit 3 are taken in as shown in FIG. 11, and a correction signal generated based on the shift data so and the pulse signal seio2 is output to the correction voltage generation circuit 5.

In more detail, there is generated a correction signal as shown by a waveform (g) in FIG. 13 having a rectangular waveform of which logic level becomes "H" at the rise-time of the shift data so as shown by a waveform (e) in FIG. 13 and becomes "L" at the rise-time of the pulse signal seio2 as shown by a waveform (f) in FIG. 13.

Then the correction voltage generation circuit 5 outputs a correction voltage $V_{1'}$ having a waveform as shown by a waveform (d) in FIG. 13 based on the correction signal having the above-mentioned rectangular waveform from the correction signal generation circuit 404.

Figure 12:
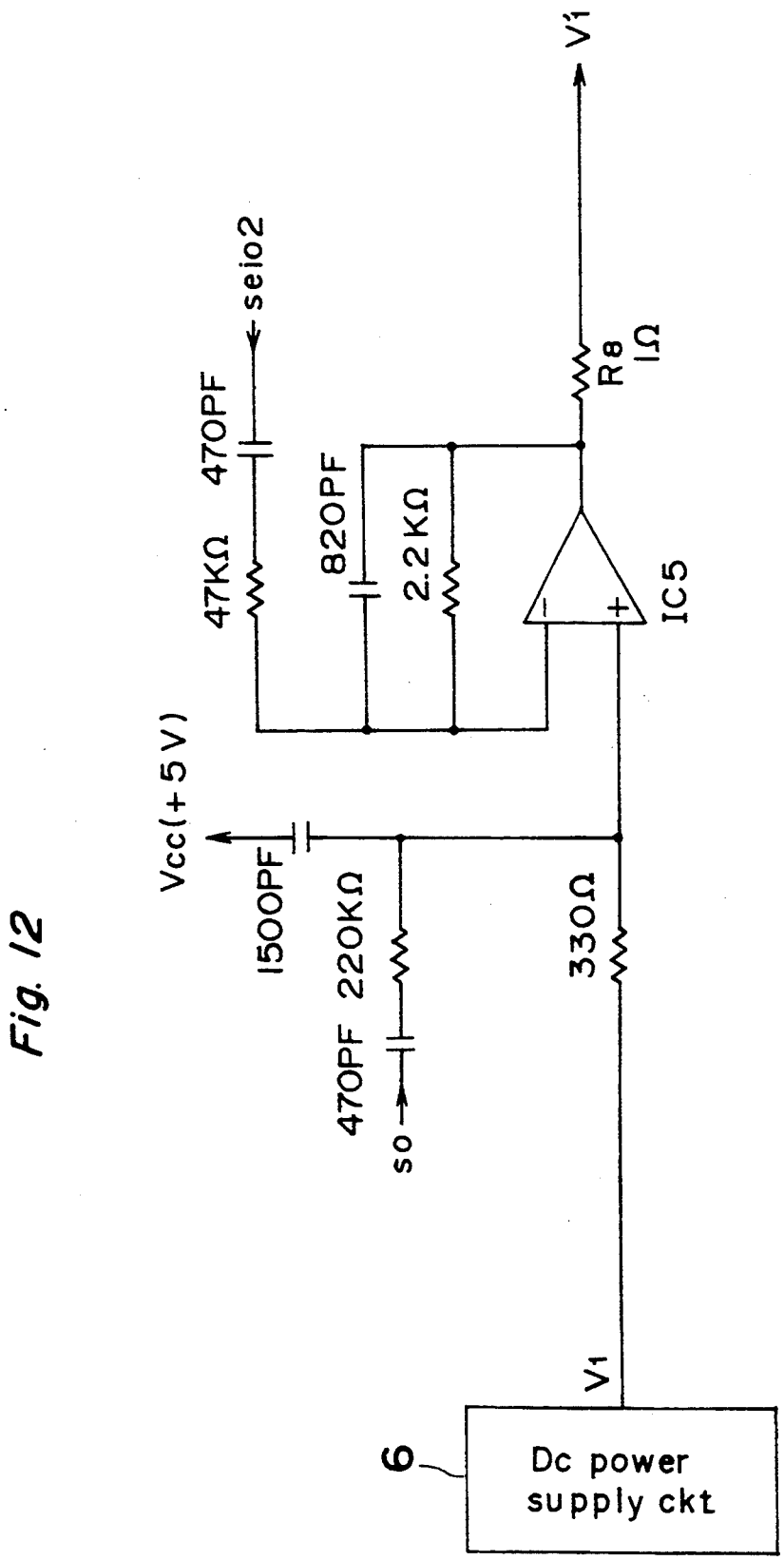
FIG. 12 is a diagram of an exemplified correction signal generation circuit and an exemplified correction voltage generation circuit as shown in FIG. 11.

The correction signal generation circuit 404 which generates the above-mentioned correction signal and the correction voltage generation circuit 5 which generates the correction voltage $V_{1'}$ are each required in practice to be composed of a combination of a simple digital circuit such as a flip-flop circuit and a CR circuit, or a CR circuit as shown in FIG. 12.

When a higher accuracy is required, it is required that a variable resistor is incorporated to the CR circuit as shown in FIG. 12 to make the CR circuit adjustable for each common electrode Y.

According to the present fourth embodiment as described above, the correction signal having a rectangular waveform is generated in the correction signal generation circuit 404 based on the shift data so input to the segment electrode drive circuit 3 and the pulse signal seio2 output from the segment electrode drive circuit 3. Therefore, the correction voltage $V_{1'}$ can be generated easily without storing any correction data into the internal memory nor providing any additional parts to allow a voltage induced at the common electrode Y attributed to the scanning voltage $V_5$ applied to the segment electrode X placed in the lower position to be removed.

<Fifth embodiment>

Figure 14:
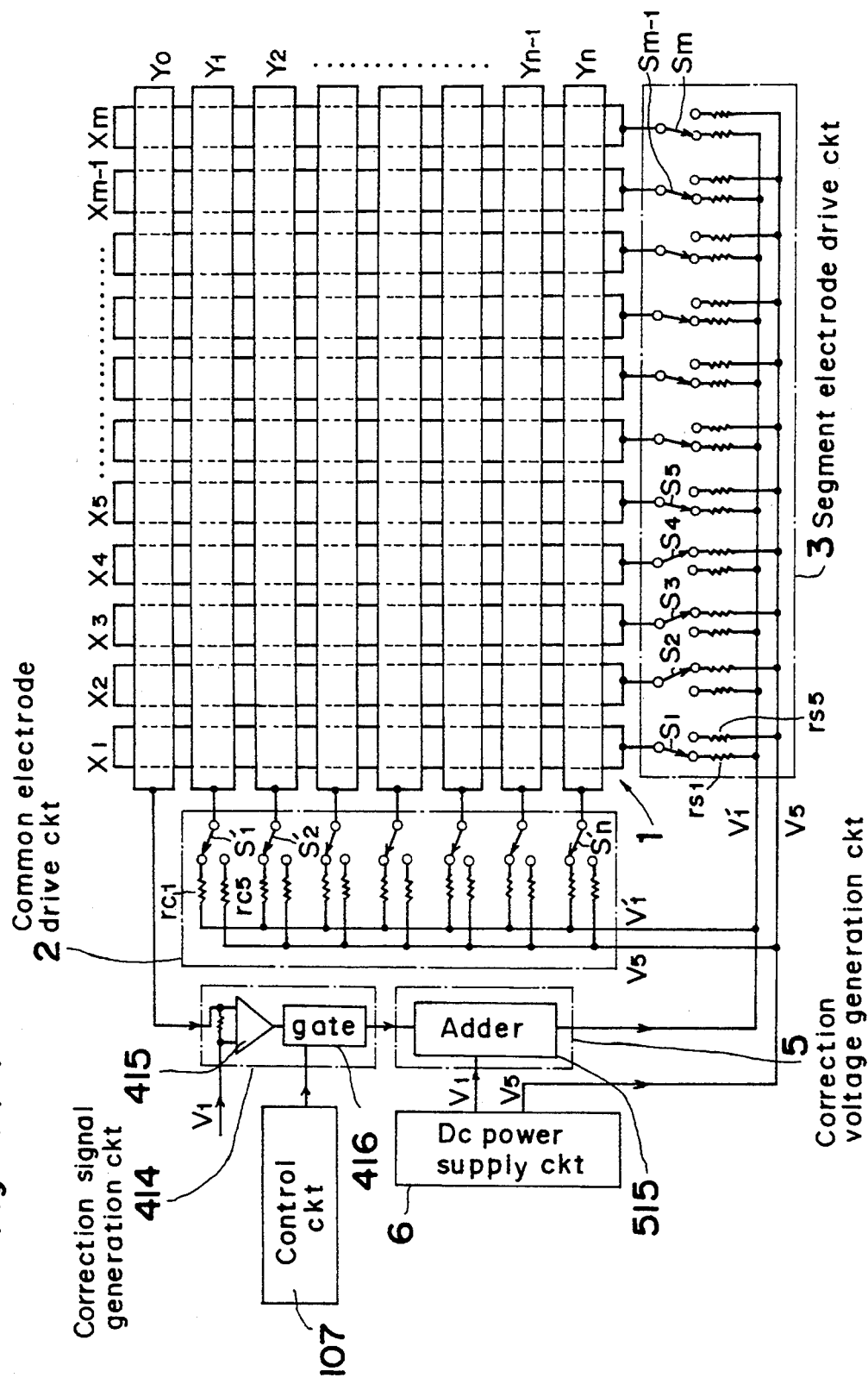
FIGS. 14(a), 14(b) and 14(c) are diagrams of exemplified power supply systems different from that shown in FIG. 11.

Referring to FIG. 14(a), the fifth embodiment differs from the third and fourth embodiments only in a correction signal generation circuit 414. As shown in FIG. 14(a), the correction signal generation circuit 414 of the fifth embodiment outputs to the correction voltage generation circuit 5 a correction signal generated based on a voltage induced in the time of scanning the segment electrode X at an auxiliary electrode $Y_0$ provided in addition to the segment electrode X and the common electrode Y on the LCD panel 1.

In more detail, the auxiliary electrode $Y_0$ is provided against the segment electrode X in parallel with a common electrode $Y_1$ outside the common electrode $Y_1$ in the same plane as that of the common electrodes Y placed in the upper position. When the scanning voltage $V_5$ is applied to the segment electrode X in the x-coordinate detection period, a voltage is induced at the auxiliary electrode $Y_0$ in the same manner as the common electrode Y to generate a voltage having a waveform (a) shown in FIG. 13 (note that the reference voltage is not $V_1$).

The voltage induced at the auxiliary electrode $Y_0$ is detected by the correction signal generation circuit 414 including an operational amplifier 415 and a gate 416 and transmitted as a correction signal to the correction voltage generation circuit 5.

Then the correction voltage generation circuit 5 including an adder 515 inverts the polarity of the correction signal having a waveform similar to the waveform (a) shown in FIG. 13, and superimposes the resulting signal on the bias power source $V_1$ from the DC power supply circuit 6 to thereby obtain a correction voltage $V_{1'}$ having a waveform (b) shown in FIG. 13.

The aforementioned auxiliary electrode $Y_0$ is not necessarily formed in the same plane as that of the common electrode Y. The auxiliary electrode $Y_0$ may be formed, for example, on the surface opposite from the common electrode Y (i.e., the reverse side). In such a case, the auxiliary electrode $Y_0$ can be formed by attaching a copper tape having an adhesive layer onto the external surface of the LCD panel 1. By adopting such an arrangement, the auxiliary electrode $Y_0$ can be easily formed afterward on a completely formed LCD panel.

In the fifth embodiment as described above, there is provided the special-use auxiliary electrode $Y_0$ for directly detecting the voltage induced at the common electrode Y attributed to the scanning voltage $V_5$ applied to the segment electrode X placed in the lower position, and then the correction voltage $V_{1'}$ is formed based on the voltage induced at the auxiliary electrode $Y_0$.

Therefore, the voltage induced at the common electrode Y attributed to the scanning voltage $V_5$ applied to the segment electrode X can be securely removed.

<Sixth embodiment>

Figure 14B:
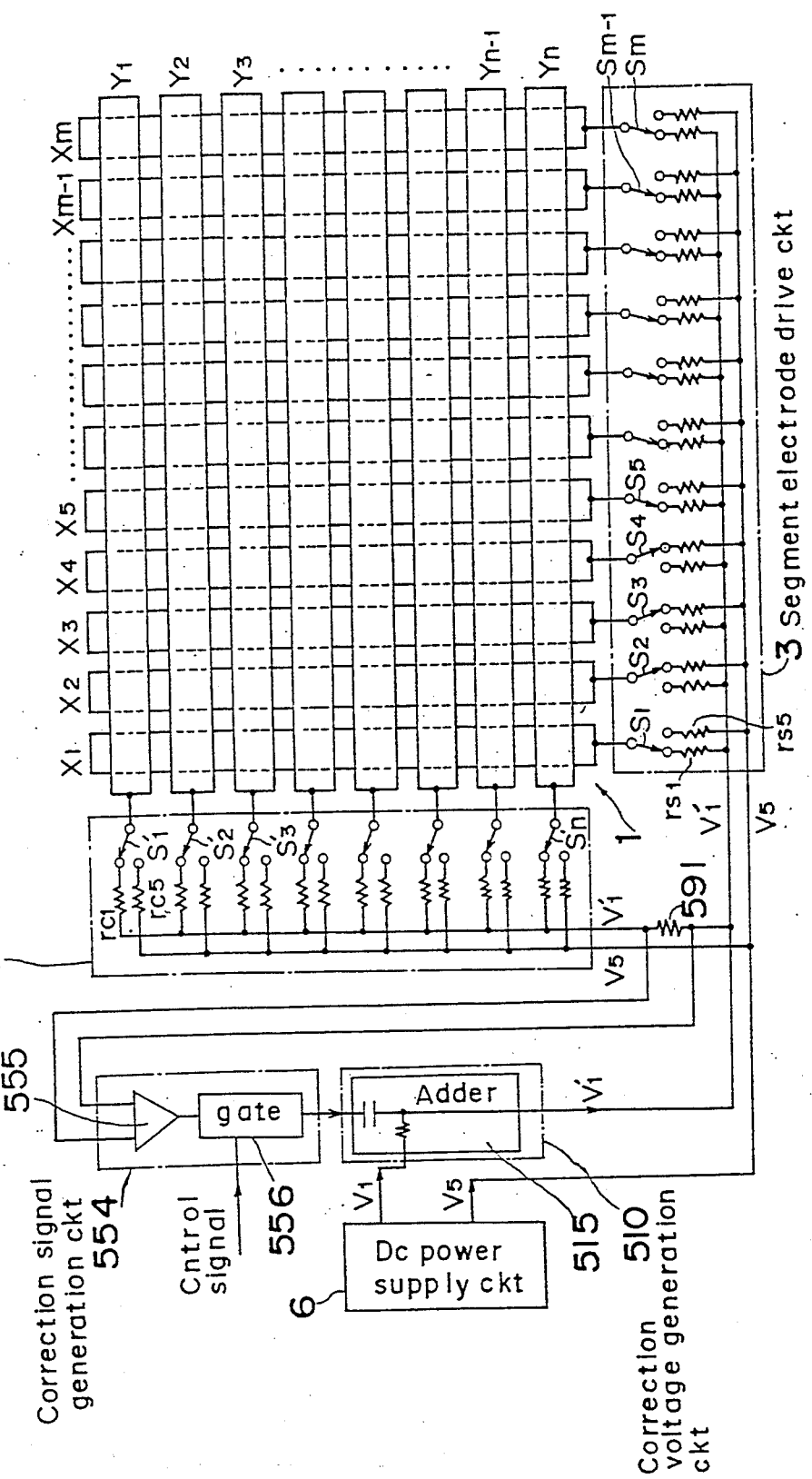

Referring to FIG. 14(b), a correction signal generation circuit 554 of the sixth embodiment detects via a resistor 591 the value of a current flowing through the common electrode Y placed in the upper position in the x-coordinate detection period when the segment electrode X placed in the lower position is scanned, and outputs the detected signal as a correction signal to the correction voltage generation circuit 515. The correction signal generation circuit 554 is composed of an amplifier 555 and a gate 556. The correction voltage generation circuit 510 is composed of an adder 515.

Figure 18:
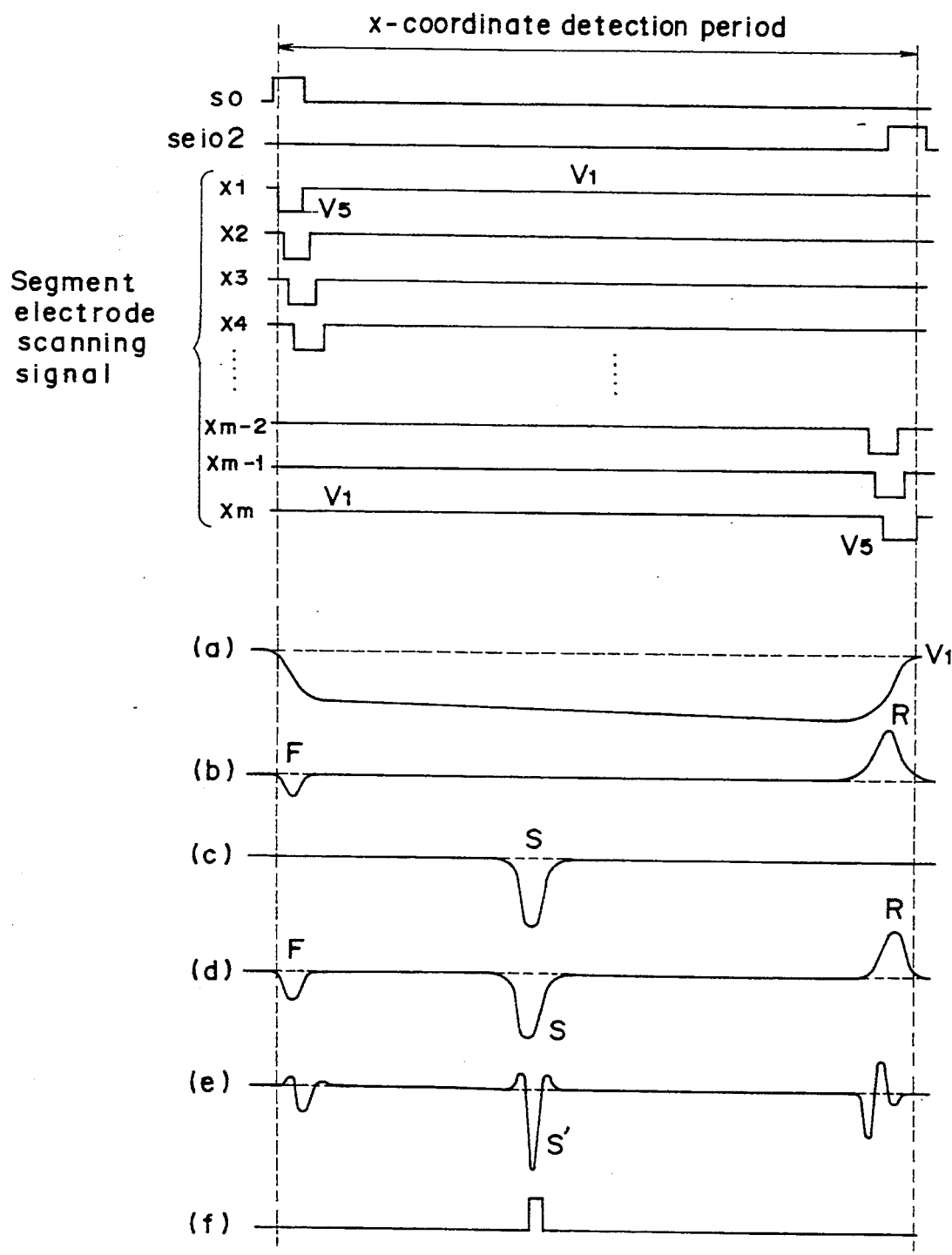
FIG. 18 is a timing chart of the segment electrode scanning signal applied to the segment electrode X in the x-coordinate detection period, a voltage at the common electrode, and an exemplified detection signal containing induction noise peaks in the display-integrated type tablet device as shown in FIG. 15.

The induction noise peaks F and R as shown in a waveform (b) in FIG. 18 are generated due to a current flowing through the common electrode Y. Therefore, the current flowing through the common electrode Y has the same waveform as the voltage waveform (a) shown in FIG. 13. With the above-mentioned arrangement, the correction voltage $V_{1'}$ can be generated by the correction voltage generation circuit 510 in the same manner as in the fifth embodiment based on the correction signal which is the current signal of the common electrode Y.

<Seventh embodiment>

Figure 14C:
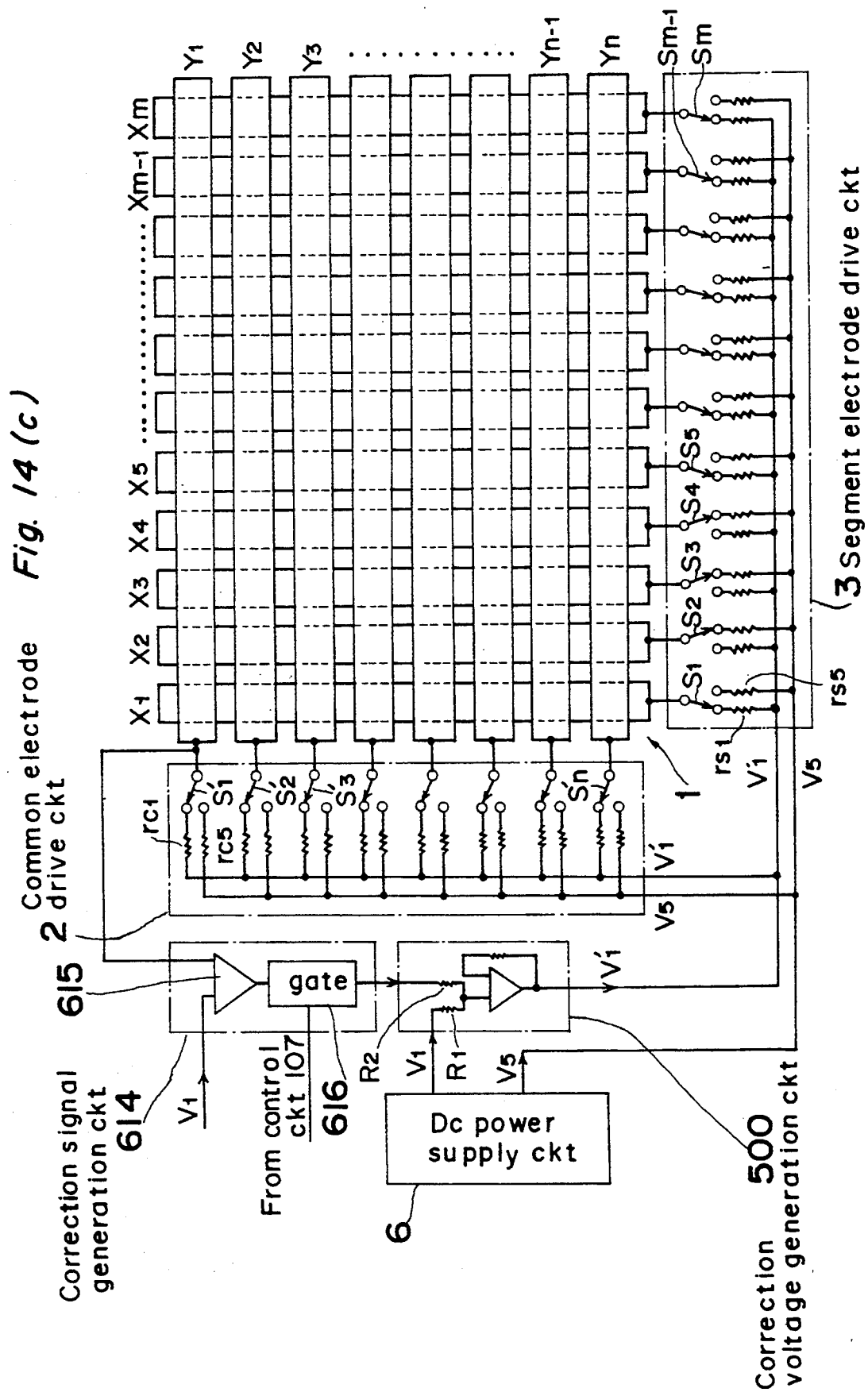
Figure 16:
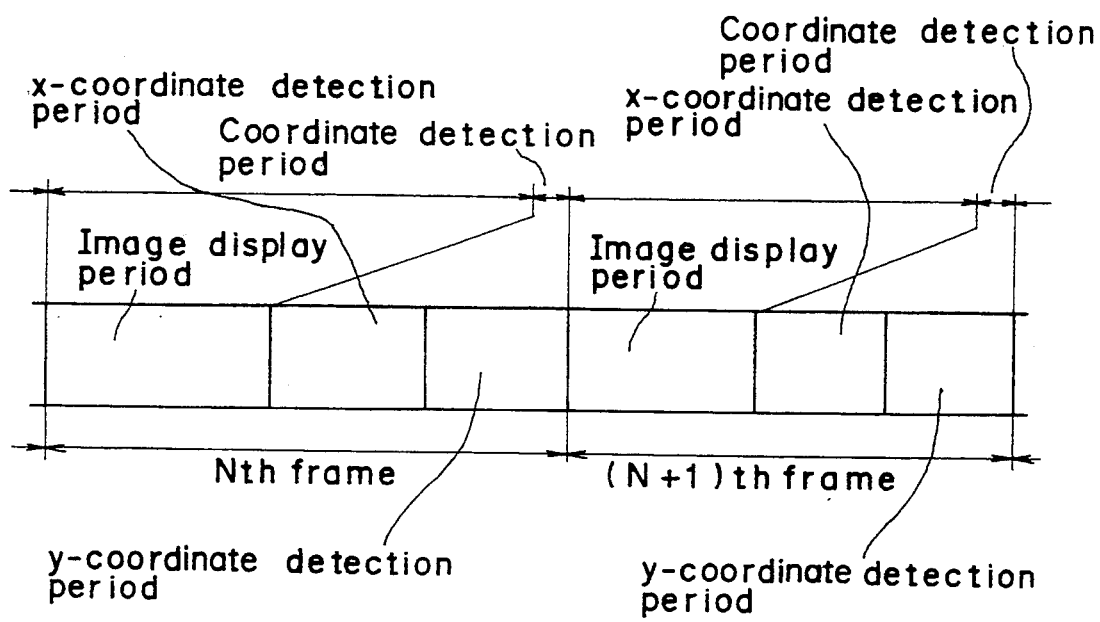
FIG. 16 is a diagram for explaining the image display period and the coordinate detection period of the display-integrated type tablet device as shown in FIG. 15.
Figure 17A:
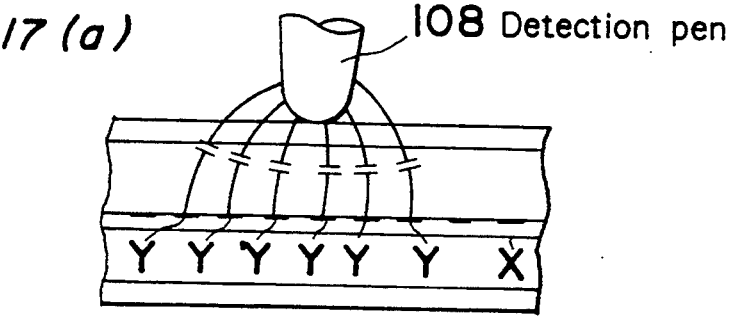
FIGS. 17(a), 17(b) and 17(c) are diagrams showing the floating capacitance between the segment electrode X or the common electrode Y and the detection pen, a detection signal obtained by the detection pen, and a binary signal of the detection signal in the display-integrated type tablet device as shown in FIG. 15.
Figure 17B:
Figure 17C:
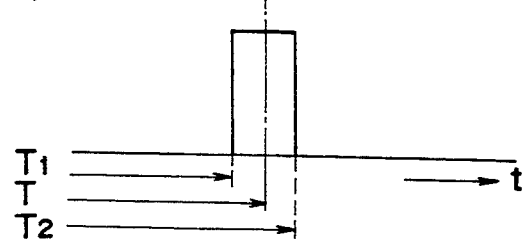

Referring to FIG. 14(c), the correction signal generation circuit 614 of the present seventh embodiment detects a voltage induced at the common electrode Y placed in the upper position attributed to the scanning voltage $V_5$ applied to the segment electrode X indirectly from the voltage at the common electrode Y when the segment electrode X placed in the lower position is scanned. Then the detected voltage at the common electrode Y is output as a correction signal to the correction voltage generation circuit 500. In more detail, according to the present seventh embodiment, the correction signal is taken out of one or a plurality of common electrodes Y instead of the auxiliary electrode $Y_0$ of the fifth embodiment. In addition, the correction signal generation circuit 614 includes an operational amplifier 615 and a gate 616.

According to the seventh embodiment as described above, the voltage induced at the common electrode Y attributed to the scanning voltage $V_5$ applied to the segment electrode X placed in the lower position is detected indirectly from the common electrode Y to generate the correction voltage $V_{1'}$ based on the detected induction voltage.

With the above-mentioned arrangement, the voltage induced at the common electrode Y attributed to the scanning voltage $V_5$ applied to the segment electrode X can be removed with a simple device construction as compared with the fifth embodiment.

Although the common electrode Y is placed over the segment electrode X in the LCD panel 1 of each of the aforementioned embodiments, the same effect can be obtained when the segment electrode X is placed over the common electrode Y. It is noted in the above case that the period when each of the correction signal generation circuits 4, 404, 554, 614 operates is required to be the y-coordinate detection period when the common electrode Y placed in the lower position is scanned.

As apparent in the above description, a display-integrated type tablet device of the present invention is provided with a correction voltage generation means for generating a correction voltage which cancels the voltage induced at the electrode placed in the upper position attributed to the scanning voltage applied to the electrode placed in the lower position farther from the detection pen out of the segment electrode and the common electrode constituting the display panel. At least in the period when the lower electrode is scanned, the correction voltage generated by the correction voltage generation means is applied to the upper electrode to cancel the voltage induced at the upper electrode, and therefore the correct non-scanning voltage is applied to the upper electrode.

Therefore, in the period when the lower electrode is scanned, no voltage is induced at the detection electrode of the detection pen due to a voltage induced at the upper electrode attributed to the scanning voltage applied to the lower electrode.

In other words, the present invention can provide a display-integrated type tablet device capable of increasing the coordinate detection accuracy by preventing detection of induction noise at the detection pen.

Furthermore, in a display-integrated type tablet device of the present invention, the correction voltage generation means has a correction signal generation circuit and a correction voltage generation circuit. The correction signal generation circuit reads out digital correction data representing a waveform which is the inverted voltage of the voltage induced at the upper electrode attributed to the scanning voltage applied to the lower electrode as stored in the internal memory, and outputs the data as a correction signal to the correction voltage generation circuit. Then the correction voltage generation circuit generates the aforementioned analog correction voltage based on the correction signal to allow the correction voltage to be generated in a simple manner.

Therefore, the present invention can provide a display-integrated type tablet device capable of increasing the coordinate detection accuracy by preventing detection of induction noise at the detection pen merely by storing the correction data in the internal memory and effecting a very simple processing operation.

Furthermore, in a display-integrated type tablet device of the present invention, each of the segment electrode and the common electrode has a shift register, and the aforementioned correction voltage generation means has a correction signal generation circuit and a correction voltage generation circuit. The correction signal generation circuit generates a binary correction signal having a pulse width substantially equal to the scanning period of the lower electrodes based on the shift data signal input to the input terminal of the first stage of the shift register of the drive circuit of either the segment electrode drive circuit or the common electrode drive circuit for scanning the lower electrodes and the pulse signal output from the output terminal of the final stage of the above-mentioned shift register at the time of ending the scanning, and transmits the correction signal to the correction voltage generation circuit. The correction voltage generation circuit generates the aforementioned analog correction voltage based on the correction signal. With the above-mentioned arrangement, the correction voltage can be generated in a simple processing operation with the shift data signal and the pulse signal which are generally used, without providing any internal memory nor special detection means.

Therefore, the present invention can provide a display-integrated type tablet device capable of increasing the coordinate detection accuracy in a simple processing operation by preventing detection of induction noise at the detection pen.

Furthermore, a display-integrated type tablet device of the present invention is provided with an auxiliary electrode facing the lower electrode farther from the detection pen, and the correction voltage generation means has a correction signal generation circuit and a correction voltage generation circuit. The correction signal generation circuit detects the voltage induced at the auxiliary electrode attributed to the scanning voltage applied to the lower electrode, and transmits the voltage as a correction signal to the correction voltage generation circuit. The correction voltage generation circuit generates a correction voltage based on the inversion signal of the correction signal to allow the voltage induced at the upper electrode to be directly detected for the generation of the correction voltage.

Therefore, the present invention can provide a display-integrated type tablet device capable of further increasing the coordinate detection accuracy by securely removing the voltage induced at the upper electrode attributed to the scanning voltage applied to the lower electrode thereby preventing detection of induction noise at the detection pen.

Furthermore, in a display-integrated type tablet device of the present invention, the correction voltage generation means has a correction signal generation circuit and a correction voltage generation circuit, and the correction signal generation circuit detects the current through the upper electrode taking place when the scanning voltage is applied to the lower electrode, and transmits the current as a correction signal to the correction voltage generation circuit. The correction voltage generation circuit generates a correction voltage based on the correction signal to allow the correction voltage to be generated based on the current flowing through the upper electrode.

Furthermore, in a display-integrated type tablet device of the present invention, the correction voltage generation means has a correction signal generation circuit and a correction voltage generation circuit, and the correction signal generation circuit detects the voltage induced at the upper electrode taking place when the scanning voltage is applied to the lower electrode, and transmits the voltage as a correction signal to the correction voltage generation circuit. The correction voltage generation circuit generates a correction voltage based on the correction signal to allow the correction voltage to be generated by indirectly detecting the voltage induced at the upper electrode with a simple device construction.

Therefore, the present invention can provide a display-integrated type tablet device capable of increasing the coordinate detection accuracy with a relatively simple device construction by preventing detection of induction noise at the detection pen.

In the forgoing explanation, described is a means for correcting voltage inducted at the upper electrodes in the time of scanning the lower electrodes. In addition, it is also important to make induction voltage lower as much as possible. For that purpose, it is necessary to lower the resistance values of the on-resistor rc1 of the common drive circuit and the common electrode formed of indium tin oxide. In the LCD panel only for displaying, the on-resistor of the common drive circuit has resistance value of about 1–2K$\Omega$, but in the LCD panel having tablet function, the LSI for drive is designed so that the on-resistor of the common drive circuit has resistance value of about 500 $\Omega$. Likewise, in the LCD panel only for displaying, the common electrode is good enough to be formed of indium tin oxide whose resistance value is about 20–30 $\Omega/\square$, while, in the LCD panel with tablet function, indium tin oxide having resistance value of about 15 $\Omega/\square$ is specifically optimum for forming the common electrodes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A display-integrated type tablet device including a display panel which has a display material interposed between segment electrodes and common electrodes crossing each other at right angles and is driven by a duty ratio control type drive method, a detection pen having at a tip of the detection pen an electrode electrostatically coupled with the segment electrodes and the common electrodes of the display panel, a segment electrode drive circuit for driving the segment electrodes, a common electrode drive circuit for driving the common electrodes, a display control circuit for displaying an image on the display panel by controlling the segment electrode drive circuit and the common electrode drive circuit in a display period for displaying the image, a detection control circuit for controlling the segment electrode drive circuit to sequentially scan the segment electrodes of the display panel by applying a scanning voltage successively to the segment electrodes and for controlling the common electrode drive circuit to sequentially scan the common electrodes by applying a scanning voltage successively to the common electrodes in a coordinate detection period composed of a first scanning period and a second scanning period, an x-coordinate detection circuit for detecting an x-coordinate value designated on the display panel by the tip of the detection pen according to an output signal generating timing of the detection pen and a scanning timing of the segment electrodes, and a y-coordinate detection circuit for detecting a y-coordinate value designated on the display panel by the tip of the detection pen according to an output signal generating timing of the detection pen and a scanning timing of the common electrodes, wherein the detection control circuit controls the segment electrode drive circuit and the common electrode drive circuit so that ones of the scanning electrodes and the common electrodes which are positioned closer to the detection pen are scanned in the first scanning period and the others of the scanning electrodes and common electrodes are scanned in the second scanning period subsequent to the first scanning period, the display-integrated type tablet device further comprises a detection circuit which receives output signals from the detection pen to detect and hold voltage variation quantities of said ones of the segment electrodes and the common electrodes and outputs reference signals corresponding to the voltage variation quantities of said ones of the segment electrodes and the common electrodes in the first scanning period, and the x-coordinate detection circuit and the y-coordinate detection circuit each operate to detect, respectively, an x-coordinate detection pulse and a y-coordinate detection pulse in the output signals from the detection pen based on the reference signals from the respective coordinate detection circuits.

2. A display-integrated type tablet device as claimed in claim 1, wherein the x-coordinate detection circuit and the y-coordinate detection circuit each comprises:

a detection circuit for detecting and holding a coordinate detection pulse in the output signal from the detection pen and outputting a detection signal;

a delay circuit for delaying the detection signal from the detection circuit for a specified period of time; and a synthesis circuit for synthesizing the detection signal from the delay circuit and the output signal from the detection pen, thereby suppressing noise following a peak of the coordinate detection pulse in the detection signal.

3. A display-integrated type tablet device as claimed in claim 2, wherein the x-coordinate detection circuit and the y-coordinate detection circuit each comprises three clamp circuits which respectively operate in synchronization with the image display period, a segment electrode scanning period, or a common electrode scanning period to take in one of: the output signal from the detection pen in the image display period; the output signal from the detection pen in the segment electrode scanning period; or the output signal from the detection pen in the common electrode scanning period, thereby preventing mutual interference, which occurs in the x-coordinate detection circuit or in the y-coordinate detection circuit, between a display voltage inversion pulse, an x-coordinate detection pulse, and a y-coordinate detection pulse, which are forming a time series as included in the output signal from the detection pen.

4. A display-integrated type tablet device as claimed in claim 1, wherein each of the x-coordinate detection circuit and the y-coordinate detection circuit comprises three clamp circuits which respectively operate in synchronization with the image display period, a segment electrode scanning period, or a common electrode scanning period to take in one of: the output signal from the detection pen in the image display period; the output signal from the detection pen in the segment electrode scanning period; or the output signal from the detection pen in the common electrode scanning period, thereby preventing mutual interference, which occurs in the x-coordinate detection circuit or in the y-coordinate detection circuit, between a display voltage inversion pulse, an x-coordinate detection pulse, and a y-coordinate detection pulse, which are forming a time series as included in the output signal from the detection pen.

5. A display-integrated type tablet device as claimed in claim 4, wherein each of the x-coordinate detection circuit and the y-coordinate detection circuit further comprises a clamp circuit which operates in synchronization with the coordinate detection period to take in and clamp the output signal from the detection pen in the coordinate detection period before clamping the output signal from the detection pen in the segment electrode scanning period and the output signal from detection pen in the common electrode scanning period.

6. A display-integrated type tablet device including a display panel which has a display material interposed between segment electrodes and common electrodes crossing each other at right angles and is driven by a duty ratio control type drive method, a detection pen having at a tip of the detection pen an electrode electrostatically coupled with the segment electrodes and the common electrodes of the display panel, a segment electrode drive circuit for driving the segment electrodes, a common electrode drive circuit for driving the common electrodes, a display control circuit for displaying an image on the display panel by controlling the segment electrode drive circuit and the common electrode drive circuit in a display period for displaying the image, a detection control circuit for controlling the segment electrode drive circuit to sequentially scan the segment electrodes of the display panel by applying a scanning voltage successively to the segment electrodes and for controlling the common electrode drive circuit to sequentially scan the common electrodes by applying a scanning voltage successively to the common electrodes in a coordinate detection period, an x-coordinate detection circuit for detecting an x-coordinate value designated on the display panel by the tip of the detection pen according to an output signal generating timing of the detection pen and a scanning timing of the segment electrodes, and a y-coordinate detection circuit for detecting a y-coordinate value designated on the display panel by the tip of the detection pen according to an output signal generating timing of the detection pen and a scanning timing of the common electrodes, the display-integrated type tablet device further comprising a detection circuit for receiving an output signal from the detection pen to detect and hold voltage variation quantities of the segment electrodes and the common electrodes and outputting reference signals corresponding to the voltage variations of the segment electrodes and the common electrodes in the image display period, and the x-coordinate detection circuit and the y-coordinate detection circuit each operating to detect, respectively an x-coordinate detection pulse and a y-coordinate detection pulse, in the output signals from the detection pen based on the reference signals from the respective coordinate detection circuits.

7. A display-integrated type tablet device as claimed in claim 6, wherein the x-coordinate detection circuit and the y-coordinate detection circuit each comprises:

a detection circuit for detecting and holding the coordinate detection pulse in the output signal from the detection pen and outputting a detection signal;

a delay circuit for delaying the detection signal from the detection circuit for a specified period of time; and a synthesis circuit for synthesizing the detection signal from the delay circuit and the output signal from the detection pen, thereby suppressing noise following a peak of the coordinate detection pulse in the detection signal.

8. A display-integrated type tablet device as claimed in claim 7, wherein the x-coordinate detection circuit and the y-coordinate detection circuit each comprises three clamp circuits which respectively operate in synchronization with the image display period, a segment electrode scanning period, or a common electrode scanning period to take in one of: the output signal from the detection pen in the image display period; the output signal from the detection pen in the segment electrode scanning period; or the output signal from the detection pen in the common electrode scanning period, thereby preventing mutual interference, which occurs in the x-coordinate detection circuit or in the y-coordinate detection circuit, between a display voltage inversion pulse, an x-coordinate detection pulse, and a y-coordinate detection pulse, which are forming a time series as included in the output signal from the detection pen.

9. A display-integrated type tablet device as claimed in claim 6, wherein the x-coordinate detection circuit and the y-coordinate detection circuit each comprises three clamp circuits which respectively operate in synchronization with the image display period, a segment electrode scanning period, or a common electrode scanning period to take in one of the output signal from the detection pen in the image display period; the output signal from the detection pen in the segment electrode scanning period; or the output signal from the detection pen in the common electrode scanning period, thereby preventing mutual interference, which occurs in the x-coordinate detection circuit or in the y-coordinate detection circuit, between a display voltage inversion pulse, an x-coordinate detection pulse, and a y-coordinate detection pulse, which are forming a time series as included in the output signal from the detection pen.

10. A display-integrated type tablet device including a display panel which has a display material interposed between segment electrodes and common electrodes crossing each other at right angles and is driven by a duty ratio control type drive method, a detection pen having at a tip of the detection pen an electrode electrostatically coupled with the segment electrodes and the common electrodes of the display panel, a segment electrode drive circuit for driving the segment electrodes, a common electrode drive circuit for driving the common electrodes, a display control circuit for displaying an image on the display panel by controlling the segment electrode drive circuit and the common electrode drive circuit in a display period for displaying the image, a detection control circuit for controlling the segment electrode drive circuit to sequentially scan the segment electrodes of the display panel by applying a scanning voltage successively to the segment electrodes and for controlling the common electrode drive circuit to sequentially scan the common electrodes by applying a scanning voltage successively to the common electrodes in a coordinate detection period, an x-coordinate detection circuit for detecting an x-coordinate value designated on the display panel by the tip of the detection pen according to an output signal generating timing of the detection pen and a scanning timing of the segment electrodes, and a y-coordinate detection circuit for detecting a y-coordinate value designated on the display panel by the tip of the detection pen according to an output signal generating timing of the detection pen and a scanning timing of the common electrodes, the display-integrated type tablet device further comprising a detection circuit for receiving output signals from the detection pen to detect and hold a voltage quantities of ones of the segment electrodes and the common electrodes closer to the detection pen and outputting reference signals corresponding to the voltage variations of the ones of the segment electrodes and the common electrodes in the image display period, and the x-coordinate detection circuit and the y-coordinate detection circuit each operating to detect, respectively, an x-coordinate detection pulse and a y-coordinate detection pulse in the output signals from the detection pen based on the reference signals from the respective coordinate circuits.

11. A display-integrated type tablet device as claimed in claim 10, wherein the x-coordinate detection circuit and the y-coordinate detection circuit each comprises:

a detection circuit for detecting and holding a coordinate detection pulse in the output signal from the detection pen and outputting a detection signal;

a delay circuit for delaying the detection signal from the detection circuit for a specified period of time; and a synthesis circuit for synthesizing the detection signal from the delay circuit and the output signal from the detection pen, thereby suppressing noise following a peak of the coordinate detection pulse in the detection signal.

12. A display-integrated type tablet device as claimed in claim 11, wherein the x-coordinate detection circuit and the y-coordinate detection circuit each comprises three clamp circuits which respectively operate in synchronization with the image display period, a segment electrode scanning period, or a common electrode scanning period to take in one of: the output signal from the detection pen in the image display period; the output signal from the detection pen in the segment electrode scanning period; or the output signal from the detection pen in the common electrode scanning period, thereby preventing mutual interference, which occurs in the x-coordinate detection circuit or in the y-coordinate detection circuit, between a display voltage inversion pulse, an x-coordinate detection pulse, and a y-coordinate detection pulse, which are forming a time series as included in the output signal from the detection pen.

13. A display-integrated type tablet device as claimed in claim 10, wherein each of the x-coordinate detection circuit and the y-coordinate detection circuit comprises three clamp circuits which respectively operate in synchronization with the image display period, a segment electrode scanning period, or a common electrode scanning period to take in one of the output signal from the detection pen in the image display period; the output signal from the detection pen in the segment electrode scanning period; or the output signal from the detection pen in the common electrode scanning period, thereby preventing mutual interference, which occurs in the x-coordinate detection circuit or in the y-coordinate detection circuit, between a display voltage inversion pulse, an x-coordinate detection pulse, and a y-coordinate detection pulse, which are forming a time series as included in the output signal from the detection pen.

14. A display-integrated type tablet device including a display panel which has a display material interposed between first electrodes and second electrodes crossing each other, a detection pen having at a tip of the detection pen an electrode electrostatically coupled with the first electrodes and the second electrodes of the display panel, a first electrode drive circuit for driving the first electrodes, a second electrode drive circuit for driving the second electrodes, a display control circuit for displaying an image on the display panel by controlling the first electrode drive circuit and the second electrode drive circuit in a display period for displaying the image, a detection control circuit for controlling the first electrode drive circuit to sequentially scan the first electrodes of the display panel by applying a scanning voltage successively to the first electrodes and for controlling the second electrode drive circuit to sequentially scan the second electrodes by applying a scanning voltage successively to the second electrodes in a coordinate detection period, an x-coordinate detection circuit for detecting an x-coordinate value designated on the display panel by the tip of the detection pen according to an output signal generating timing of the detection pen and a scanning timing of the first electrodes, and a y-coordinate detection circuit for detecting a y-coordinate value designated on the display panel by the tip of the detection pen according to an output signal generating timing of the detection pen and a scanning timing of the second electrodes, the display-integrated type tablet device further comprising a reference signal generation circuit for receiving output signals from the detection pen and outputting reference signals in the image display period, and wherein at least one of the x-coordinate detection circuit or the y-coordinate detection circuit operates to detect a coordinate detection pulse in the output signal from the detection pen based on the reference signal from the reference signal generation circuit.

15. A display-integrated type tablet device as claimed in claim 14, wherein the x-coordinate detection circuit or the y-coordinate detection circuit comprises three clamp circuits which respectively operate in synchronization with the image display period, a first electrode scanning period, or a second electrode scanning period to take in one of the output signal from the detection pen in the image display period; the output signal from the detection pen in the first electrode scanning period; or the output signal from the detection pen in the second electrode scanning period, thereby preventing mutual interference, which possibly occurs in the x-coordinate detection circuit or the y-coordinate detection circuit, between a display voltage inversion pulse, an x-coordinate detection pulse, and a y-coordinate detection pulse, which are forming a time series as included in the output signal from the detection pen.

16. A display-integrated type tablet device as claimed in claim 14, wherein the first electrodes are segment electrodes and the second electrodes are common electrodes.

17. A display-integrated type tablet device as claimed in claim 14, wherein the selected ones of the first electrodes and the second electrodes are ones thereof closer to the detection pen.

18. A display-integrated type tablet device as claimed in claim 14, wherein the reference signal generation circuit detects and holds a voltage variation quantity of at least one of the first electrodes and the second electrodes for outputting the reference signal.

19. A display-integrated type tablet device including a display panel which has a display material interposed between first electrodes and second electrodes crossing each other, a detection pen having at a tip of the detection pen an electrode electrostatically coupled with the first electrodes and the second electrodes of the display panel, a first electrode drive circuit for driving the first electrodes, a second electrode drive circuit for driving the second electrodes, a display control circuit for displaying an image on the display panel by controlling the first electrode drive circuit and the second electrode drive circuit in a display period for displaying the image, a detection control circuit for controlling the first electrode drive circuit to sequentially scan the first electrodes of the display panel by applying a scanning voltage successively to the first electrodes and for controlling the second electrode drive circuit to sequentially scan the second electrodes by applying a scanning voltage successively to the second electrodes in a coordinate detection period, an x-coordinate detection circuit for detecting an x-coordinate value designated on the display panel by the tip of the detection pen according to an output signal generating timing of the detection pen and a scanning timing of the first electrodes, and a y-coordinate detection circuit for detecting a y-coordinate value designated on the display panel by the tip of the detection pen according to an output signal generating timing of the detection pen and a scanning timing of the second electrodes, wherein the x-coordinate detection circuit and the y-coordinate detection circuit each comprises:
- a detection circuit for detecting and holding the output signal from the detection pen and outputting a detection signal;
- a delay circuit for delaying the detection signal from the detection circuit for a specified period of time; and
- a synthesis circuit for synthesizing the detection signal from the delay circuit and the output signal from the detection pen, thereby suppressing noise following a peak of the coordinate detection pulse in the detection signal.

20. A display-integrated type tablet device as claimed in claim 19, wherein the x-coordinate detection circuit or the y-coordinate detection circuit comprises three clamp circuits which respectively operate in synchronization with the image display period, a first electrode scanning period or a second electrode scanning period to take in one of the output signal from the detection pen in the image display period; the output signal from the detection pen in the first electrode scanning period; or the output signal from the detection pen in the second electrode scanning period, thereby preventing mutual interference, which possibly occurs in the x-coordinate detection circuit or the y-coordinate detection circuit, between a display voltage inversion pulse, an x-coordinate detection pulse, and a y-coordinate detection pulse, which are forming a time series as included in the output signal from the detection pen.

21. A display-integrated type tablet device as claimed in claim 19, wherein the first electrodes are segment electrodes and the second electrodes are common electrodes.

22. A display-integrated type tablet device as claimed in claim 19, wherein the selected ones of the first electrodes and the second electrodes are ones thereof closer to the detection pen.

23. A display-integrated type tablet device including a display panel which has a display material interposed between first electrodes and second electrodes crossing each other, a detection pen having at a tip of the detection pen an electrode electrostatically coupled with the first electrodes and the second electrodes of the display panel, a first electrode drive circuit for driving the first electrodes, a second electrode drive circuit for driving the second electrodes, a display control circuit for displaying an image on the display panel by controlling the first electrode drive circuit and the second electrode drive circuit in a display period for displaying the image, a detection control circuit for controlling the first electrode drive circuit to sequentially scan the first electrodes of the display panel by applying a scanning voltage successively to the first electrodes and for controlling the second electrode drive circuit to sequentially scan the second electrodes by applying a scanning voltage successively to the second electrodes in a coordinate detection period, an x-coordinate detection circuit for detecting an x-coordinate value designated on the display panel by the tip of the detection pen according to an output signal generating timing of the detection pen and a scanning timing of the first electrodes, and a y-coordinate detection circuit for detecting a y-coordinate value designated on the display panel by the tip of the detection pen according to an output signal generating timing of the detection pen and a scanning timing of the second electrodes, wherein each of the x-coordinate detection circuit and the y-coordinate detection circuit comprises three clamp circuits which respectively operate in synchronization with the image display period, a first electrode scanning period, or a second electrode scanning period to take in one of the output signal from the detection pen in the image display period; the output signal from the detection pen in the first electrode scanning period; or the output signal from the detection pen in the second electrode scanning period, thereby preventing mutual interference, which possibly occurs in the x-coordinate detection circuit or in the y-coordinate detection circuit, between a display voltage inversion pulse, an x-coordinate detection pulse, and a y-coordinate detection pulse, which are forming a time series as included in the output signal from the detection pen.

24. A display-integrated type tablet device as claimed in claim 23, wherein the first electrodes are segment electrodes and the second electrodes are common electrodes.

25. A display-integrated type tablet device including a display panel which has a display material interposed between first electrodes and second electrodes crossing each other at right angles and is driven by a duty ratio control type drive method, a detection pen having at a tip of the detection pen an electrode electrostatically coupled with the first electrodes and the second electrodes of the display panel, a first electrode drive circuit for driving the first electrodes, a second electrode drive circuit for driving the second electrodes, a display control circuit for displaying an image on the display panel by controlling the first electrode drive circuit and the second electrode drive circuit in a display period for displaying the image, a detection control circuit for controlling the first electrode drive circuit to sequentially scan the first electrodes of the display panel by applying a scanning voltage successively to the first electrodes and for controlling the second electrode drive circuit to sequentially scan the second electrodes by applying a scanning voltage successively to the second electrodes in a coordinate detection period, an x-coordinate detection circuit for detecting an x-coordinate value designated on the display panel by the tip of the detection pen according to an output signal generating timing of the detection pen and a scanning timing of the first electrodes, and a y-coordinate detection circuit for detecting a y-coordinate value designated on the display panel by the tip of the detection pen according to an output signal generating timing of the detection pen and a scanning timing of the second electrodes, the display-integrated type tablet device further comprising a detection circuit for receiving output signals from the detection pen to detect and hold voltage variation quantities of selected ones of the first electrodes and the second electrodes closer to the detection pen and outputting reference signals corresponding to the voltage variations of the selected ones of the first electrodes and the second electrodes in the image display period, and the x-coordinate detection circuit and the y-coordinate detection circuit each operate to detect a coordinate detection pulse in the output signal from the detection pen based on the reference signal from the detection circuit.

26. A display-integrated type tablet device as claimed in claim 25, wherein the x-coordinate detection circuit and the y-coordinate detection circuit each comprises:

a detection circuit for detecting and holding a coordinate detection pulse in the output signal from the detection pen and outputting a detection signal;

a delay circuit for delaying the detection signal from the detection circuit for a specified period of time; and a synthesis circuit for synthesizing the detection signal from the delay circuit and the output signal from the detection pen, thereby suppressing noise following a peak of the coordinate detection pulse in the detection signal.

27. A display-integrated type tablet device as claimed in claim 26, wherein the x-coordinate detection circuit and the y-coordinate detection circuit each comprises three clamp circuits which respectively operate in synchronization with the image display period, a first electrode scanning period, or a second electrode scanning period to take in one of the output signal from the detection pen in the image display period; the output signal from the detection pen in the first electrode scanning period; or the output signal from the detection pen in the second electrode scanning period, thereby preventing mutual interference, which possibly occurs in the x-coordinate detection circuit or the y-coordinate detection circuit, between a display voltage inversion pulse, an x-coordinate detection pulse, and a y-coordinate detection pulse, which are forming a time series as included in the output signal from the detection pen.

28. A display-integrated type tablet device as claimed in claim 25, wherein each of the x-coordinate detection circuit and the y-coordinate detection circuit comprises three clamp circuits which respectively operate in synchronization with the image display period, a first electrode scanning period, or a second electrode scanning period to take in one of the output signal from the detection pen in the image display period, the output signal from the detection pen in the first electrode scanning period; or the output signal from the detection pen in the second electrode scanning period, thereby preventing mutual interference, which possibly occurs in the x-coordinate detection circuit or the y-coordinate detection circuit, between a display voltage inversion pulse, an x-coordinate detection pulse, and a y-coordinate detection pulse, which are forming a time series as included in the output signal from the detection pen.

29. A display-integrated type tablet device as claimed in claim 25, wherein the first electrodes are segment electrodes and the second electrodes are common electrodes.

* * * * *